United States Patent
Holveck et al.

(10) Patent No.: US 12,040,613 B2
(45) Date of Patent: Jul. 16, 2024

(54) LOAD SHEDDING

(71) Applicant: Lunar Energy, Inc., Mountain View, CA (US)

(72) Inventors: Mark Holveck, Sunnyvale, CA (US); Randol Aikin, Sunnyvale, CA (US)

(73) Assignee: Lunar Energy, Inc., Mountain View, CA (US)

( * ) Notice: Subject to any disclaimer, the term of this patent is extended or adjusted under 35 U.S.C. 154(b) by 0 days.

(21) Appl. No.: 17/963,775

(22) Filed: Oct. 11, 2022

(65) Prior Publication Data

US 2023/0208139 A1    Jun. 29, 2023

Related U.S. Application Data

(60) Provisional application No. 63/293,323, filed on Dec. 23, 2021.

(51) Int. Cl.
*H02J 3/14* (2006.01)
*H01H 9/56* (2006.01)

(52) U.S. Cl.
CPC ............... *H02J 3/144* (2020.01); *H01H 9/56* (2013.01); *H02J 2300/24* (2020.01); *H02J 2310/12* (2020.01); *H02J 2310/60* (2020.01); *Y02B 70/3225* (2013.01); *Y04S 20/222* (2013.01)

(58) Field of Classification Search
CPC ......... H02J 3/144; H02J 2310/60; H01H 9/56
See application file for complete search history.

(56) References Cited

U.S. PATENT DOCUMENTS

| | | | |
|---|---|---|---|
| 8,849,471 B2 | 9/2014 | Daniel | |
| 11,522,365 B1 * | 12/2022 | Cooper | H02J 3/14 |
| 2005/0203987 A1 | 9/2005 | Ewing | |
| 2008/0109205 A1 | 5/2008 | Nasle | |
| 2009/0123045 A1 | 5/2009 | Quadling | |
| 2009/0195349 A1 | 8/2009 | Frader-Thompson | |
| 2010/0038966 A1 | 2/2010 | Espeut, Jr. | |
| 2011/0184581 A1 | 7/2011 | Storch | |
| 2014/0268458 A1 | 9/2014 | Luciani | |
| 2020/0203959 A1 | 6/2020 | Clay | |
| 2020/0401176 A1 | 12/2020 | Forbes, Jr. | |

FOREIGN PATENT DOCUMENTS

WO    2021043317    3/2021

* cited by examiner

*Primary Examiner* — Daniel Cavallari
(74) *Attorney, Agent, or Firm* — Van Pelt, Yi & James LLP

(57) ABSTRACT

Controlling a load includes sensing a characteristic of a circuit. A device loads the circuit. It further includes, based at least in part on the sensed characteristic, determining whether the circuit is in a state in which load shedding should be performed. It further includes controlling a switch to control power from the circuit to the device.

7 Claims, 6 Drawing Sheets

LOAD SHEDDING

CROSS-REFERENCE TO OTHER APPLICATIONS

This application claims priority to U.S. Provisional Patent Application No. 63/293,323 entitled LOAD SHEDDING filed Dec. 23, 2021 which is incorporated herein by reference for all purposes.

BACKGROUND OF THE INVENTION

In existing home battery backup systems, when the battery system is operating in an off-grid mode and is supplying power to the home independently and without assistance from the power grid, the battery system can become overloaded. When existing battery systems are overloaded by having to power too many electrical loads at once, they simply supply power for as long as they can before overheating or damage to the battery system occurs, where the battery system then shuts down. This leads to an undesirable user experience.

While a battery system may be designed to be large enough such that it is does not become overloaded in a worst-case condition, this is costly, and an inefficient use of resources, as the efficiency and the usage of the batteries is not maximized in regular operation.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are techniques for intelligent load management. The intelligent load management techniques described herein include intelligent modulating of loads. In various embodiments, the load modulation techniques described herein include load shedding, time of use arbitration, load optimization, etc.

Example Power System

Figure 1:
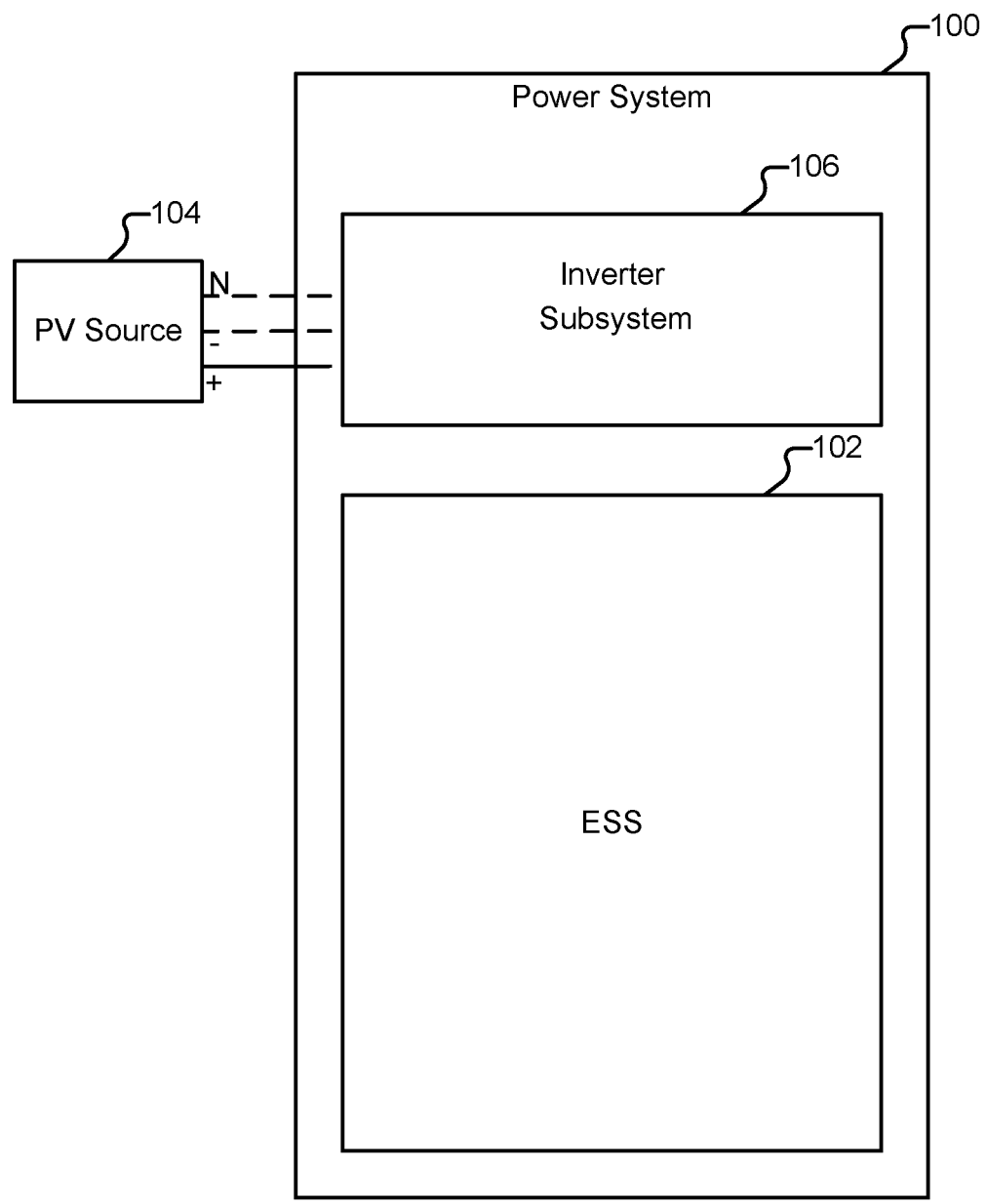
FIG. 1 illustrates an embodiment of a power system.

FIG. 1 illustrates an embodiment of a power system. Power system 100 includes an integrated energy storage system (ESS) 102, such as batteries or other types of energy storage. The power system also includes an integrated input for a photovoltaic (PV) source 104, such as an array of solar panels. As shown in this example, the power system also includes an integrated inverter 106 that has a bi-directional power connection from the ESS, as well as a connection to receive input power from the solar panels (i.e., the inverter includes multiple power interfaces for accepting both battery and solar power). In this example, the inverter 106 is configured to operate in both on-grid and off-grid modes. For example, in addition to being connected to an endpoint such as a home via a connection to the main service panel, the inverter may also be tied to the utility grid to provide power to the grid when there is excess solar capacity. The inverter may also supply power to the home from the battery storage system, such as in an off-grid situation where there is a power outage and the grid or electrical power network is not able to supply electrical power to the home. Further, the home may shift between drawing electrical power from the grid and the battery storage.

As one example of using the load modulation techniques described herein, electrical loads may be selectively or intelligently turned off, reduced, or otherwise modulated in order to prevent overload of a power source such as an inverter (e.g., load shedding). For example, a power system using the intelligent load modulation techniques described herein may choose which loads to turn off, and in what order, to avoid an overload situation. This provides a similar user experience to having a large enough battery system to accommodate the worst-case loading scenario, but without having to purchase and install more battery storage than is necessary for typical usage. That is, using the intelligent load modulation techniques described herein, a user may purchase a smaller-sized battery system with the capabilities of a much larger battery system for much less cost. For example, the user is able to purchase a battery system that is capable of 10 kW with a 15 kW surge, rather than needing a 20 kW system with a 25 kW surge, which would be dramatically more expensive. In this way, the cost of the home battery storage system is optimized to achieve a seamless, whole-home backup experience.

As will be described in further detail below, the intelligent load modulation techniques described herein are facilitated by the use of intelligent power control devices (also referred to herein as "power control switches," "load control devices", and "load switches"), which control or modulate power to loads that they are connected to, including, for example, determining whether a load should be connected to, or disconnected from, an electric circuit that is able to provide power to the load (e.g., to perform load shedding). In other embodiments, modulating the power to loads includes determining whether power to the load should be reduced (e.g., by adjusting the voltage supplied to the load). The type of load reduction performed by the load control device may also be determined based on the type of load connected to the load controller. For example, if the load is a smart load, the load control device may transmit a signal to the smart device to instruct it to shut off (where the load modulation is performed over network communications in this example, such as Bluetooth, WiFi, etc.). As will be described in further detail below, in various embodiments, the power control devices are configured to perform load control autonomously. For example, the load control devices perform local decisions on whether to modulate power to loads based on local electrical measurements made by the load control device. In this way, the load control devices can operate autonomously and independently, without relying on real-time communication of instructions from entities remote to the load control device.

Example Environment

Figure 2:
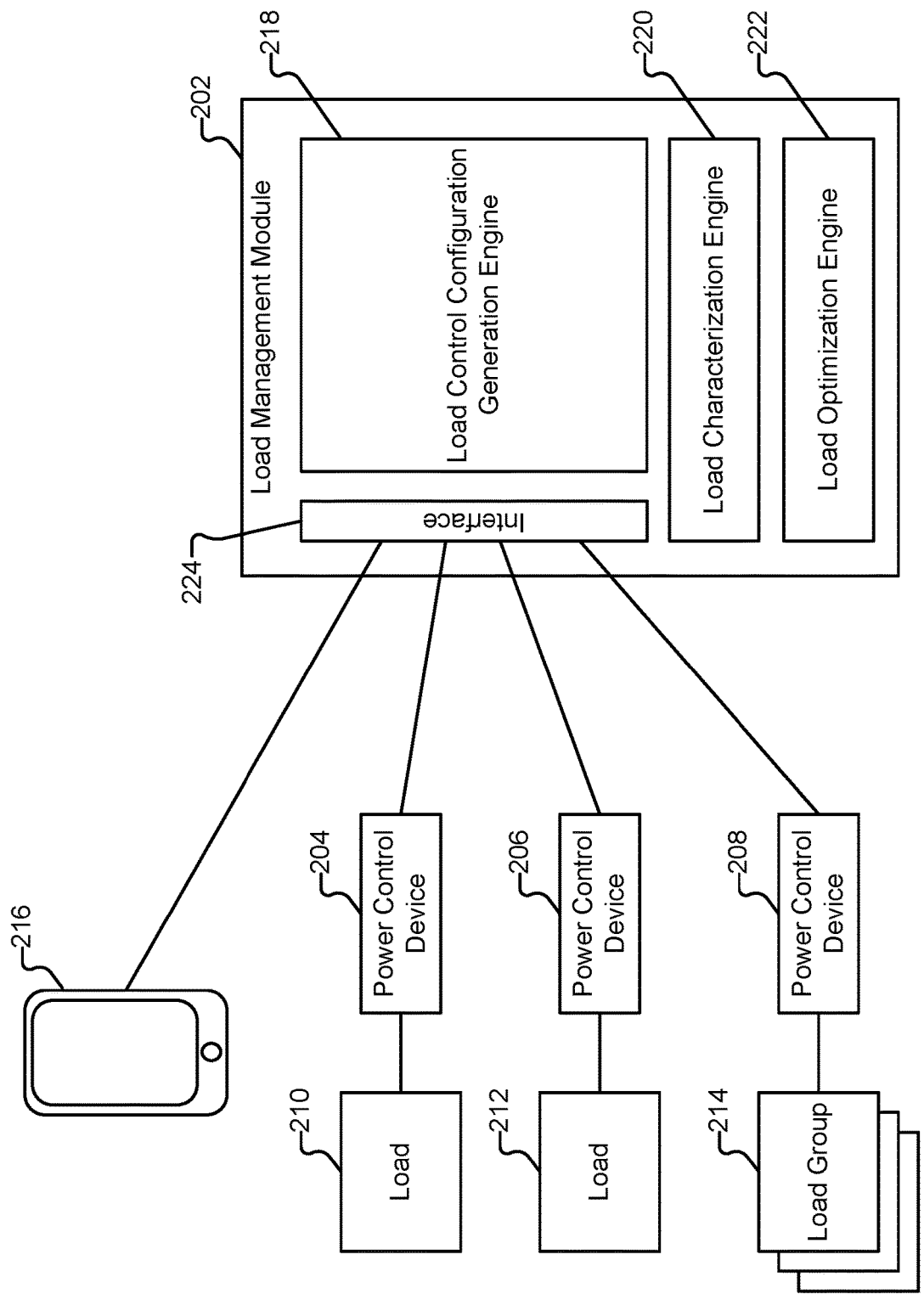
FIG. 2 illustrates an embodiment of an environment in which load management is performed.

FIG. 2 illustrates an embodiment of an environment in which load management is performed. In this example, a home has installed a power system such as power system 100. In this example, power system 100 includes a load management module 202.

In some embodiments, the load management module is configured to manage loads in the home's electrical network by configuring or programming the behavior of power control devices connected to the loads in the home. In some embodiments, the load management module uses a global view of the power system, energy storage system (e.g., battery storage, fuel cell storage, etc.), inverter, power control devices, connected loads, etc. to intelligently manage the power control devices to optimize whole-home energy management.

In some embodiments, the load management module is included in a computing device which, as one example, is included as part of inverter subsystem 106 of power system 100. In other embodiments, the load management module is implemented in a separate on-premise device at the home, such as in a standalone console or hub. In other embodiments, the load management module is implemented at a backend, in the cloud. A hybrid load management scheme may be used, where load management is distributed across a computing device local to the home, as well as at a backend server.

As will be described in further detail below, the power control devices include controllable switches or power converters that are used to connect (and/or disconnect) or otherwise modulate power to the loads on the home's electrical network, thereby controlling whether the loads are connected to power, the amount of power drawn by the load, etc. In some embodiments, the load management module provides load control programs to the power control devices, where the power control devices execute their respective load control programs to autonomously detect the state of the electrical circuit and control the power to the loads according to the predefined programs generated and provided by the load management module (such that the power control device is able to independently determine when and how to modulate power to a connected load, without requiring an explicit command from the load management module to do so). In other embodiments, the load management module transmits explicit commands/instructions to the power control devices, which execute the instructions from the load management module in real-time. In some embodiments, a power control device is able to both operate autonomously, as well as execute commands from a remote entity such as the load management module.

As shown in the example of FIG. 2, power control devices 204, 206, and 208 control power from the home's circuit to load 210, load 212, and load group 214, respectively. That is, each power control device is correlated with a specific load or group of loads, which may depend on electrical installation (e.g., connection to specific loads, connection to branch circuits, etc.).

As shown in the above examples, an intelligent load control device may be attached to a single load or a group of loads. In some embodiments, rather than the entire power system shutting down completely in the event of an overload, the overloading scenario may be avoided or prevented using the load management techniques described herein by shutting or shedding particular or specific loads or groups of loads, while otherwise allowing other loads to be kept active. This provides a dramatically improved user experience. For example, a load control switch may be used to modulate and feed power to a branch circuit, rather than a single load. As will be described in further detail below, in one embodiment, the load control device is implemented as an intelligent circuit breaker. The intelligent circuit breaker may be used to replace an existing circuit breaker in order for loads on that circuit to be controlled all at once (e.g., turned on and off all at once).

As one example of controlling power to a group of loads, suppose that a homeowner has a sub-panel in a pool house. Suppose that the homeowner does not intend to back up the pool house when their home power network is off-grid and is running off of battery storage/solar power. In this example, the homeowner would like the entire pool house, which has its own circuit breaker panel with a 50 A (amp) main and various other circuit breakers, to be shut off. Using the techniques described herein, the entire pool house may be turned off by placing a 50 A smart load control breaker in their main panel. In this way, the group of loads connected to the pool house's branch circuit may be shut off altogether.

As will be described in further detail below, in some embodiments, the load control devices may be remotely controlled from a centralized entity such as a hub in the home, or load management module of the inverter, where a load control device is configured to execute commands it receives. In other embodiments, as will also be described in further detail below, the intelligent power control devices are software-driven and operate autonomously according to individual load control programs (also referred to herein as power control configurations or profiles), and are able to operate without explicit command from a centralized entity for the switch to modulate (e.g., shed) loads in real-time. In this way, the load control devices perform local decisions on how to control power to its connected loads. This allows load control processes such as load shedding to be performed even in situations when an intelligent power control device is unable to communicate with other entities (e.g., load management module) that can provide instructions/commands.

Thus, the load control devices may both operate autonomously to modulate power to a connected load, or be remotely controlled to modulate loads. For example, when the home's power network is operating in on-grid mode, there may be little load shedding for a load control device to perform autonomously, as the power utility grid is unlikely to need assistance due to being overloaded. However, in the event that the grid were to falter, or when the home network goes off grid and the inverter in the home becomes the source of power for the various loads in the home and is faltering, then the load control devices may operate autonomously (according to their load control configurations) to assist the inverter. As will be described in further detail below, in some embodiments, the load control devices may autonomously make decisions on whether to turn on or off a load (e.g., connect or disconnect power to the load) based on circuit characteristics observed/measured by the load control devices, where a certain pattern of electrical characteristics may be indicative of the state of a power source such as an inverter (e.g., based on detected frequency fluctuations, as will be described in further detail below).

As will be described in further detail below, while the home power system is on-grid, the load control devices may also be remotely controlled and commanded to modulate loads on/off explicitly to perform time of use arbitration, including energy optimization (e.g. to optimize the homeowner's utility bill). For example, a load control device used to modulate the power to a hot water heater may be given an instruction to not run the hot water heater between 5 pm and 9 pm by turning the hot water heater off during those times. The instruction or command signal to the load control device may be transmitted from a main controller, such as a hub in the home (e.g., in the inverter), or from a remote cloud entity. In other embodiments, the load control device is programmed to perform such load management (e.g., time of use arbitration) autonomously, via its load control programming.

As will also be described in further detail below, the intelligent power control devices described herein may be configured to have priority-based behavior. Here, a user may prioritize their loads, for example, in terms of importance, which indicates the order in which loads should be turned off or shed. In this way, a user is provided control over the experience of controlling their power system.

Example Power Control Device

Figure 3:
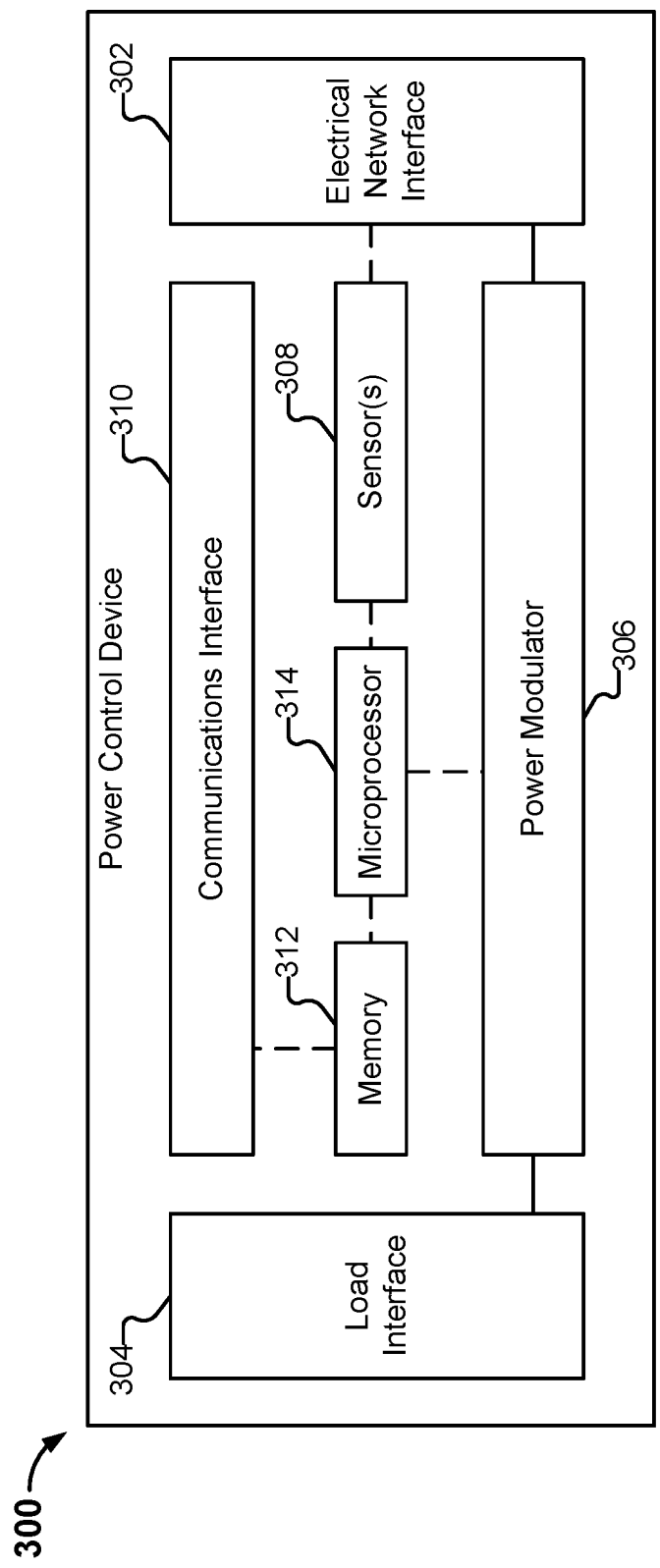
FIG. 3 illustrates an embodiment of an intelligent power control device.

FIG. 3 illustrates an embodiment of an intelligent power control device. As will be described in further detail below, the use of the software-driven autonomous power control devices described herein facilitates automatic control of power to loads, such as automatic load shutoff behavior (e.g., load shedding) during overload situations or during backup, automatic load modulation for time of use arbitration and optimizing use of excess solar power, etc.

For example, via preconfigured load control programs, which will be described in further detail below, the intelligent power control devices described herein are configured to autonomously and independently behave in a manner that avoids overload quickly, where, even if a large load turns on in the home during backup, the power control devices react quickly enough to disconnect power to their loads to avoid inverter overload. This ability to react quickly is implemented in part by configuring or programming the intelligent power control devices to operate autonomously, where communication among the switches and other components of the power system is not required for a load control device to perform load shedding actions. Rather, the power control device is able to make a power modulation decision based on locally observed sensor measurement information.

For example, while communication among components of the power system may be used for configuration of power control devices (e.g., where a centralized computing device such as the load management module of the inverter described above provides power control configurations that are distributed to load switches), the power control devices need not wait for instructions or commands from other components of the power system to actuate their switches (or otherwise modulate power to the loads). Rather, the power control devices operate independently and autonomously according to the preconfigured load control programs they are executing, where the power control devices are programmed, for example, to automatically protect the home battery system inverter from overload by turning off the load locally connected to the power control device. In this way, while the power control devices are able to operate independently of each other, collectively the actions they perform may be used to assist or support the inverter when it becomes overloaded and has difficulty supplying sufficient power to the loads that are demanding power.

Power/Load Interfaces

In the example of FIG. 3, the intelligent power control device includes two power interfaces, an interface 302 to the home's electrical network/circuit (on which power is delivered from the grid and/or inverter), and an interface 304 to the load (or group(s) of loads). As described herein, the power control device is configured to control power to loads, such as determining whether or not to pass power from the line to the load. In some embodiments, the interfaces are AC (alternating current) power interfaces.

Power Modulator/Converter

In some embodiments, the intelligent power control device includes a power modulator 306. One example of a power modulator is a switch, such as a relay or a solid-state switch. One example of a relay is a metal strip that may be actuated or moved back and forth electromagnetically. In one position, the strip makes contact with another metal switch, allowing electricity to flow through the strip. In the other position, the strip is opened and is not in contact with the other metal switch, and electricity is prevented from flowing through the strip.

Solid-state switches include silicon-based power switch devices such as a MOSFET (Metal-Oxide Semiconductor Field Effect Transistor). The solid-state switch allows electricity to flow through based on an electrical signal. Solid-state switches may be used for their speed and fast reaction time.

In some embodiments, the power control device includes a power converter to more generally modulate power to loads. For example, the solid-state switch may be used to perform power conversion by turning the solid state switch on/off at high frequency. The power delivered to the load may be modulated using, for example, pulse-width modulation (PWM). In other embodiments, other types of power converters may be used instead of a switch or relay.

Sensors

In some embodiments, the intelligent power control device includes a set of sensors 308. The sensors are configured to sense or otherwise measure various electrical characteristics of the power line or circuit to which the switch is connected (e.g., via electrical network interface 302).

As one example, the set of sensors includes a voltage measurement sensor to sense the voltage on the line (or both lines in a 240V system). The voltage sensor takes measurements or samples of the voltage over time (e.g., periodic measurement of line voltages on capacitors at load control device), where the measurements are used to determine the voltage waveform or pattern on the line. As another example, the set of sensors is used to determine voltage frequency. Sensors for detecting current (e.g., current passing through the power control device to the load) and phase may also be included in the set of sensors 308. In some embodiments, the current sensor is used to determine if a particular load is active or inactive. Various actions may be taken based on the activity state of the load. For example, if the load is determined to be inactive, in some embodiments, the load control device is configured to open the circuit/switch to prevent the load from being turned on. In this way, loads that are already active may be prioritized over loads that may turn on automatically (e.g., water heater, which may turn on or off according to their own logic, without explicit user command). In this way, the electrical characteristics of the AC power being delivered may be measured. As one example, the electrical measurements are interpreted to determine a state of a power source, such as an inverter, such as how loaded the inverter is. As will be described in further detail below, in some embodiments, a load control device includes a model of an AC power source such as an inverter, and the load control device uses the sensor measurements to make, locally at the load control device, an estimation of the amount of (aggregate) load on the inverter (where, as will be described in further detail below, the amount of load on the inverter is represented in some embodiments by an estimate of the amount of power being outputted by the inverter). The load control device, based on the estimated amount of load on the inverter, is configured to perform load control according to the load control program it is executing. For example, if, based on the sensor measurements, it is determined that the inverter is heavily loaded, then the load control device may, according to its programming, shed its load.

Communications Interface

In some embodiments, the power control device includes a communications subsystem/interface 310. In some embodiments, the communications interface is used, for example, to receive configuration information. For example, the configuration information includes a load control program that is received from a load management module. Examples of communications interfaces include interfaces for 900 MHz communication, power line communications, WiFi, etc.

Memory

In some embodiments, the intelligent power control device includes a memory 312. The memory is used, for example, to store a power control program and other associated information.

Microprocessor

In some embodiments, the power control device includes a microprocessor 314. In some embodiments, the microprocessor is configured to control the power modulator (e.g., the mechanical relay or solid state relay, or power converter, as described above). The microprocessor is configured to perform various functions such as executing a load control program, further details of which will be described below. In various embodiments, this includes using sensor measurements to characterize a state of an electrical circuit (and to estimate a condition of a power source that provides power to a site such as a home), as well as using the state information to perform a load control action.

For example, the microprocessor executing the load control program is configured to use the sensor measurements taken by sensor(s) 308 to determine state information pertaining to the circuit. This includes analyzing or evaluating the electrical measurements taken by the sensors (e.g., voltage, current, frequency, phase, etc.) and, in various embodiments, determining state information such as how loaded a power source (such as the inverter) is, whether the power system is operating on grid or off grid, etc. Further details regarding characterizing circuit state information are described below.

Based on the state of the circuit (determined by sensing characteristics of the electrical network) and the instructions provided in the load control program being executed by the power control device, the microcontroller is configured to determine, for example according to its load control program, how to control power to the load. This may include opening switch 306 to disconnect the load from power (i.e., perform load shedding), otherwise reducing or modulating power to a connected set of loads, etc. Further details and examples regarding logic for using a state of an electrical circuit as an input and determining how to modulate power to a set of loads based on the detected state of the electrical circuit are described below.

Form of the Power Control Device

The power control device may be implemented in a variety of ways, and in a variety of form factors. For example, appliances such as dryers and electric stoves are typically plugged into outlets, and in some embodiments, the intelligent, software-driven power control device described herein is integrated into an outlet (e.g., 120V or 240V outlet). For appliances that are hardwired, such as hot water heaters and air conditioners, the power control device may be implemented as part of a breaker. As another example, the power control device may also be included in a junction box that is mounted to the wall. For example, the power control device is included in a physical package, with ports to install wires. In some embodiments, the power control device includes user controls such as buttons to allow user interaction. In some embodiments, the power control device includes indicators such as lights to facilitate displaying of status information. Another example of a power control device is a load control hub architecture, embodiments of which are described in further detail below.

Load Management Configuration

In some embodiments, referring to the example of FIG. 2, the user is provided an interface via which to configure load management settings. As one example, the user uses a browser-based web interface, an application installed on a computing device (e.g., a laptop or desktop), or a mobile application installed on mobile device 216 (e.g., a smartphone, tablet, or other computing device) that allows them to manage the usage of energy in their home. The user may also use other devices to configure the behavior of their home power system, such as through a console device, a desktop computer, laptop, etc.

In some embodiments, via the load management interface, the user may configure the behavior of their power system under various conditions. For example, the user may configure actions to take in the event that the home goes off-grid. This may include configuring load shedding prioritization, as will be described in further detail below. As another example, the load management interface may be used by the user to configure time of use arbitration parameters. Thus, via the interfaces described herein, the user may configure power control settings under various modes of operation.

As one example of an action that may be taken by the user, the user, via an interface such as a mobile application, may command a device to be turned on or off. The corresponding power control device then executes the command it receives.

Configuring Load Shedding Prioritization

Another example of an action that the user may take in configuring load management is to configure load shedding prioritization, such as when the home is operating in backup mode (e.g., because the utility grid is down).

As one example, a user is provided an interface via which to prioritize the order in which loads are shed. As described above, each power control device in the home is correlated to a specific load or group of loads. In some embodiments, power control devices are labeled with an identifier to indicate what type of load the power control device controls. For example, a power control device connected to the hot water heater may be labeled as "hot water heater." A power control device connected to the dryer may be labeled as "dryer."

In this example, the loads/groups of loads connected to the power control devices are included or otherwise presented in a priority settings list in the user's mobile application (e.g., via their corresponding labels). The user may then indicate the order in which loads should be shed relative to each other. In some embodiments, the load shedding prioritization specifies the order in which devices should be turned off, and is used to rank the importance for keeping a given load on (or off). For example, consider two sets of loads, a hot tub water heater and a group of loads that includes networking devices such as the home's modem and WiFi router. The user may specify that the network device loads should be higher priority compared to the hot water heater, and the hot tub water heater a lower priority relative to the network device loads. That is, in the event of the home going off-grid and in a state where load shedding may be beneficial, power to the hot tub water heater should be shutoff before the networking device loads are cut off from power.

Other types of power configurations may be specified by the user through the mobile application. For example, in addition to prioritizing load shedding behavior, the user may also specify whether they would like a load to run in backup mode at all. In this case, a user may specify, for a specific load, that it should be turned off completely when the power system is in backup mode. The user may configure more sophisticated options as well. For example, the user may specify above what threshold level of energy in the battery storage must be available before the load is permitted to run (i.e., be connected back to the home electrical network to receive/draw power). In the above example of configuring a load to be turned off immediately when in backup mode, the user may specify that a load should be disconnected from power whenever the battery storage is below 100%.

Thus, using the load management techniques and software-driven load control devices described herein, users are provided control over loads at various levels of granularity. For example, suppose that a user has a hot tub heater. Using the intelligent load management techniques described herein, the user may select to have the hot tub heater automatically turn off while in backup/off-grid mode, rather than having to pay for a much larger and expensive battery system that would accommodate the hot tub heater being on while in backup. The user is still also provided the choice or option to turn the hot tub heater back on (e.g., via a control interface such as that provided via a mobile app, as described above), even during back up mode and after it was turned off, via a software-driven intelligent switch. Here, even though the power control device that controls power to the hot tub heater was configured, via the mobile app, to turn off the hot tub heater while the battery system is in backup mode to avoid wasting of battery power, the user is provided controls to elect to turn the hot tub heater back on if so desired.

In some embodiments, based on the user configuration of load management (e.g., via the mobile app described above), the load management module is configured to generate load control programs.

As described above, in some embodiments, a load control configuration for a power control device is a program that is executed by the power control device, where the power control device autonomously determines how to control power to a connected load according to the load control program that the load control device is executing (as well as the detected state of an electrical circuit as input). For example, with respect to load shedding, the load control program may include instructions that indicate the conditions or criteria (e.g., certain detected pattern or circuit electrical state) for disconnecting power (or performing some other load shedding related operation) to the load connected to the power control device. As will be described in further detail below, the conditions or criteria for load shedding include the state of the electrical circuit or network, where the state may be characterized based on measurements or the detection of certain electrical events of the home's electrical network (where, in some embodiments, as described above, the power control device includes sensors for capturing various electrical measurements). As another example, the power control device estimates an amount of total load on a power source. Using various thresholds or parameters included in the load control program, the power control device determines how stressed the power source is. For example, the power control device determines, given the estimated amount of total load on the power source, how much overhead there is remaining in the power source to provide power, how close the power source is to being at a limit to provide power, etc. As one example, the power control device, in determining how close the power source is to operating at its limit, then determines whether to shed its corresponding load. In some embodiments, to effect or cause an aggregate or global prioritization scheme among a plurality of disparate power control devices that are autonomously operating independently of each other, different power control devices are programmed with different load control configurations according to a prioritization scheme. For example, two power control devices may be provide two different values for the maximum operating limit of the power source. For example, one limit is set to be lower than the other. Thus, for the same estimated total load on a power source that is determined by the two power control devices, the power control device configured with a lower maximum operating limit will determine that the power source is operating closer to its limit, as compared to the power control device configured with a higher maximum operating limit. If the load control programs include logic that causes a load to be shed based on how close the power source is operating to its limit, then the power control device configured with the lower maximum operating limit will shut off its load first, before the power control device configured with the higher maximum operating limit. As shown in this example, one way of enforcing or implementing a global prioritization is to set different power source performance parameters and bounds. Further details regarding implementing prioritization are described below.

In some embodiments, the load control program includes instructions that determine what power control actions are taken in response to the detection or sensing of different states of the electrical circuit. For example, load control rules may be configured in the load control program, where a rule specifies that if certain criteria are met, then a set of actions is performed. For example, a load control rule may specify that for a given or particular detected state of the electrical system, a corresponding action or set of actions is to be performed.

Different power control devices may receive different load shedding programming. For example, the conditions under which one power control device is programmed to shed its connected load may be different than the conditions under which another power control device is programmed to shed its connected load. This may be used to cause power control devices to shed their loads according to a desired plan (e.g., prioritization).

In some embodiments, setting the conditions for a power control device to perform load shedding includes setting one or more load shedding parameters. For example, in response to the detection of certain electrical events (or combinations of electrical events that indicate a state of the electrical circuit), a corresponding power control action defined by the load control program is performed.

Further details and examples of load configuration programs are described below.

The generated load control programs are then transmitted to the power control devices. For example, the load control configurations that define the power control behavior of the power control devices and, for example, define how to determine a state of an electrical circuit and the conditions under which the power control devices perform various power modulation actions, are communicated to their corresponding or respective power control devices via one or more communications channels or paths (e.g., via interface 224). For example, the load control power control settings may be communicated via powerline communications, a 900 MHz signal, and/or WiFi.

Load Shedding

The following are embodiments of load control programs executed by power control devices to facilitate autonomous load shedding. Based on the load control programs/configurations, the power control devices may autonomously characterize the state of the electrical circuit, and determine (without instruction from other components or devices in the network) how to modulate attached loads accordingly. For example, one goal of the load shedding described herein is to prevent overload of a power source such as an inverter. As described above, in some embodiments, the various power control devices behave autonomously, so that they can react quickly to changing conditions (e.g., a sudden change to off-grid mode) without requiring the load management module to send an explicit, on-demand remote instruction to actuate the switches in the power control devices for real-time control.

In some embodiments, a load shedding program includes the at least two following components. The first is logic to characterize a state of the electrical circuit based on sensor measurements. The second is logic to autonomously determine whether to shed a load based on the characterized state.

Electrical State Characterization Logic

In some embodiments, the load control program includes code that, when executed by a power control device, takes sensor measurements made by the power control device as inputs and uses the sensor measurements to determine or characterize a state of the circuit or other components in the circuit. The load control program, when executing, may then, based on the state of the circuit, cause the load control device to control power to the load accordingly. In some embodiments, the electrical measurements of the circuit are used to determine the state of the inverter. The load control device may then determine, for example, whether the inverter is under strain and is overloaded, and based on this information autonomously determine, according to its programming, whether it should shed its loads to assist the inverter to prevent overload or otherwise reduce the load on the inverter. As another example, as described above, the load control device may be used to determine whether a load is active or inactive, and perform load control based on the activity state. For example, if the load is inactive, in some embodiments, the load control device is configured to open the circuit to prevent the load from being turned on. In this way, loads that are already active may be prioritized over loads that may turn on (e.g., water heater, which may turn on or off according to their own logic, without explicit user command).

The state of the circuit may be characterized in a variety of ways and may be determined from multiple electrical sensor measurements. For example, the set of sensors on the power control device is used to determine voltage, current, and/or frequency, where the electrical measurements are used to determine circuit state information.

In some embodiments, the load control device determines whether to shed its load(s) based on a load state of a power source of the home's electrical network (e.g., inverter when the home's electrical system is in backup mode). As described above, in some embodiments, load shedding is performed to reduce the burden on the inverter so that it does not become overloaded. In some embodiments, a load control device is configured to take various sensor measurements to determine a characteristic or state of an electrical circuit. This includes using the sensor measurements to determine how loaded the inverter and the home electrical network are. In some embodiments, if a load control device determines that the inverter is becoming overloaded, then it autonomously sheds its load to reduce the load on the inverter. Based on the sensor measurements, other state information regarding the electrical circuit may be determined, such as whether the home network is on grid or off grid.

Further details regarding state characterization are described below.

Power Source Load State

The following are embodiments of determining the state of loading of a power source such as an inverter.

Inverter Model

In some embodiments, the inverter (e.g., inverter 106) is designed or otherwise configured to modify its output (which is the AC power that is delivered to the home's electrical network/circuit) according to a profile. The profile may include a variety of states and corresponding outputs, where the output of the inverter is indicative of the state of the inverter. For example, the inverter may modify its output according to the amount of loading on the inverter, such as via a droop profile, further details of which are described below.

In some embodiments, a load control device is programmed with a model of the inverter. Based on the electrical measurements captured by the load control device and the model of the inverter, the load control device may then determine the state or condition of the inverter (where the state of the circuit is determined based on the output of the inverter when it is the power source). Based on the locally determined condition of the inverter, the load control device may then determine whether it needs to reduce the burden on the inverter by shedding its connected load.

In this way, the load control device is configured with a model of the source of power (inverter in this example), and may use the model to determine the condition or state of the power source from the electrical characteristics of the power being provided by the inverter, and in turn determine whether it should modulate power to its loads to relieve stress on the power source (e.g., to prevent the power source from being overloaded).

In some embodiments, the load control device has a model of the inverter, but does not distinguish between the inverter or the utility power grid as a power source. That is, the load control device more generally has a model of a power source, and behaves autonomously according to the condition of the power source determined based on the model and electrical circuit measurements. For example, when the home network is on grid and the utility is the power source, then the load control device may view this as the inverter being unstrained and able to handle any loads. In this way, the load control device need not be signaled or notified or alerted by another component to indicate whether a site such as a home is on-grid or off-grid. The load control device programming is agnostic to the type of power source. Or, for example, the load control device is programmed to monitor what it believes is an inverter, where when the system is on-grid, the utility appears to the power control device as an inverter that is unlikely to be in a strained or overloaded condition.

Returning to the inverter, in some embodiments, the inverter is programmed to adjust or control, according to a model, various characteristics of its power output based on its load state. As one example, the inverter has a power instruction slope that has a mapping between power output and frequency, where the more power the inverter is requested to supply (because of higher loads/demands for power), the lower the frequency of the power that is outputted by the inverter. For example, the higher the AC power output of the inverter, the lower the frequency of the outputted AC power. Portions of the power output of the inverter is received by all of the load control devices, which are connected to the inverter via a home's electrical network. For example, when a load attached to the load control device is on, it will draw power from the power source (inverter or grid) that is being passed through the load control device, where the load control device is then able to measure the characteristics of the power being supplied to the load, from the power source, through the load control device)

In some embodiments, the inverter is designed to modulate its output according to a frequency droop profile where the frequency of the power produced by the inverter droops as the overall load on the inverter (e.g., amount of power being delivered by the inverter) increases.

For example, in one embodiment, how heavily the inverter is loaded or stressed is determined by the load control device based on the observed frequency of the electrical network providing power (as measured using the set of sensors on the load control device). For example, when off-grid, all power will be coming from, or going through, the inverter, instead of from the grid. As described above, in some embodiments, the inverter is programmed with a droop profile, where the frequency of the output of the inverter droops more as the inverter load increases. Conversely, if power is being pushed into the inverter (e.g., because there is a separate solar inverter in the house that is AC coupled and connected to the same AC line as the power system that is causing power to flow into the inverter of the power system of FIG. 1, charging the batteries), the frequency increases (as the net power of the inverter is lowered).

In this example, as the power being outputted by the inverter increases (where the power outputted by the inverter will increase as the load increases and there is more demand for power from the inverter), the frequency of the output power (frequency of the voltage and/or current) goes down. If the power outputted by the inverter decreases (e.g., because a power source is feeding into the inverter), then the frequency increases, where the power outputted by the inverter may decrease through zero, where power is going through the inverter, and the frequency continues to increase. That is, the frequency of the output of the inverter is a sliding scale relative to inverter load, where the load on the inverter may become negative because there is a power source that is feeding into the inverter.

In some embodiments, the load control device, which monitors the electrical circuit, and thus the power outputted by the inverter, may then use the electrical sensor measurements to determine the overall load on the inverter. This is beneficial, as a single load control device may only have visibility into the power consumed by its own loads, but not other loads. By using the shared inverter model, the load control device may observe the characteristics (frequency) of the power being outputted by the inverter (which would be observed to be the same for all load control devices), allowing the load control devices to have a common, global view of the overall loaded-ness of the inverter.

Detecting Load State of Power Source

As described above, in some embodiments, a load control device includes various sensors, which are used to detect the characteristics of the electrical circuit to which it is connected. Via the electrical measurements, as well as the inverter model, the load control devices are thus able to detect the characteristics of the power outputted by the inverter and being delivered over the electrical circuit when the inverter is the power source (e.g., operating off grid). Examples of the characteristics of the power being outputted that may be sensed by the load control devices include voltage, current, frequency (of voltage and/or current), or phase (of voltage and/or current).

In some embodiments, the load control devices are programmed with the same inverter model. Based on the measured characteristics of the power being delivered on the electric circuit by the inverter, the load control devices, using the inverter model, are then able to estimate or otherwise determine the state of loading of the inverter (e.g., how much load is on the inverter or whatever power source is delivering power.

The following is an example of determining a state of loading on a power source such as an inverter. In some embodiments, a load control device is configured to measure line voltages (e.g., the voltages on the two lines in a 240V system). For example, the line voltages are measured periodically, such as 10,000 times a second, or any other frequency as appropriate.

In some embodiments, during each loop or iteration of running the inverter load estimation algorithm, the load control device measures one or two line voltages (depending on whether 120V or 240V connection). In some embodiments, the measured line voltages are the voltages at capacitors on the output of the inverter.

Based on the measured line voltages and the inverter model described above, the load control device determines, in some embodiments, average inverter power and instantaneous inverter power. As one example of an inverter model, the inverter is programmed to output power according to a model of a virtual generator. In some embodiments, the load control device runs a corresponding model of the virtual generator to determine the behavior of the inverter and estimate the load on the inverter.

For example, the load control device determines, based on the inverter generator model, the behavior of a virtual generator connected to the line voltages as measured by the load control device. In some embodiments, the behavior of the virtual generator is determined by executing code that models the behavior of the virtual generator. In some embodiments, the virtual generator model of the inverter includes various states that are updated as the model is executed with new line voltage measurements as input (where the voltage is measured, for example, at 10,000 times a second, as described above). That is, the state of the imaginary generator is updated continuously as line voltage measurements are taken.

In some embodiments, the total instantaneous power output of the inverter is broken into two components, a steady state power output (e.g., average power measurement), and a transient, higher frequency component. In some embodiments, the various components of inverter power values are updated over time (e.g., as the inverter state is updated over successive cycles of the load determination algorithm executing on the load control device). As it is AC (alternating current) power being delivered, the line voltages are constantly changing (e.g., as sine waves) and are in constant flux (where sinusoidal voltages create sinusoidal power).

In some embodiments, based on the inverter model and the input line voltage measurements, a frequency of the inverter power is also determined. For example, the average frequency is determined (where the average power may be converted to average frequency according a frequency droop profile or other power output-to-frequency mapping). In some embodiments, the inverter is programmed to have its frequency and its power output be related, in steady state, by a known equation. For example, as described above, in some embodiments, the higher the power being supplied by the inverter, the lower the frequency of the outputted power. In this way, determination of the average frequency allows the load control device to estimate the average load on the inverter.

In various embodiments, the inverter model parameters are updated or calculated as incremental changes. For example, as the frequency reduces, the average power increases, eventually settling to an equilibrium state. In some embodiments, the equilibrium value is calculated by iteratively adjusting its value over many cycles. For example, as described above, the load control device is configured to measure/sample the voltage on the line periodically (e.g., at 10,000 Hz). Based on the inverter model and the voltage measurements, the load control device determines the frequency of the output of the inverter. After determining the observed frequency, using the known frequency droop profile shared between the inverter and the load control device, the load control device is then able to determine how loaded the inverter is (e.g., by using the observed frequency to derive the amount of power that the inverter is outputting, where the amount of power being outputted by the inverter is indicative of the amount of loading on the inverter).

Load Shedding Logic

As described above, by periodically taking or sampling line voltage measurements, and using the inverter model, the load control devices may autonomously or independently determine average power (average frequency), as well as transient power of the inverter (or whatever is the source of power—where, for example, the load control device assumes that it is always an inverter being the power source, but it may actually be the grid providing power, where the grid, in normal behavior, appears to the load control device as an unloaded inverter, further details of which will be described below).

In some embodiments, the load control logic performs load modulation based on state information such as the one or more of the above estimated components of the inverter power, determined frequency, etc.

Frequency-Based Load Shedding Logic

As one example of load control logic, the load controller is configured to turn off its connected load when the average frequency (determined from average power) goes below a first threshold frequency, where the connected load is then turned back on again if the frequency of the inverter output power goes above a second threshold frequency. The first and second frequency thresholds (for turning off a device and turning the device back on) need not be the same. For example, the frequency threshold for re-connecting a load to power may be set to be higher than the frequency threshold for disconnecting a load from power to provide a form of hysteresis and prevent ping-ponging or toggling of the load control switch. Further details regarding frequency-based load shedding are described below.

Power-Based Load Shedding Logic

As another example, the load control logic may take as input the total instantaneous power estimated as described above. In some embodiments, the load control device includes a fast switch, such as a solid state relay. By being reactive to the total power, which includes a transient component, the fast switch of the load control device may be used to quickly turn loads on/off to avoid or help with fast transient loads. In this way, if the inverter is suddenly attached to a very high load, the inverter need not be shut off before the load controller has reacted and shed its own load. Here, the load controller need not wait for the average power to exceed a threshold value (which may take time to settle, during which the inverter may simply shutoff) before shedding its load. That is, if the load severity is determined to be high, indicating that the inverter is under high strain, the load controller sheds its loads. In this way, a more aggressive load shedding logic may be implemented based on fast transients that include the total load, as well as slower reactions to average load (power).

The load control logic may treat the average and instantaneous power factors independently or in combination. For example, as described above, with AC power, the line voltages will be constantly changing (e.g., according to a sine wave). By splitting out the inverter power determination into a steady state equilibrium component and a transient component, a relatively steady value of the power may be determined on which to base load shedding logic. For example, if the inverter were only loaded momentarily, which may be detected via the separate transient term, the load control device may ignore the momentary loading, and not shed its load in reaction to the transient load. However, if the estimated average power is above a threshold, then this is an indication that there has been a large amount of electrical load on the inverter for a significant amount of time (and that the high load is not momentary). Shedding may then be performed based on the average inverter power.

The following are further details and embodiments regarding load shedding logic used to determine whether to disconnect or reconnect power to a load being controlled by a load control device. The load control logic behavior may be tuned according to various parameters. For example, the load control logic behavior may be tuned to be fast acting or slow acting. Examples of such parameters used by a load control device for load control include the following.

Maximum Power—a threshold value above which the inverter is determined to be overloaded (and overload is accumulated). In some embodiments, the maximum power value indicates the maximum load that the inverter can continuously handle.

Overload capacity—a value indicating an amount of overload headroom or load that an inverter can handle. In some embodiments, if the load of the inverter (e.g., total instantaneous power estimated above) is above the maximum power threshold described above, then the difference between the total instantaneous inverter power and the maximum power threshold is determined to be an amount of overload power. In some embodiments, the overload power is time-based and is accumulated over time (where the logic is being executed periodically, such as 10,000 times a second, as described above). In some embodiments, an overload percentage is calculated as a portion of the overload capacity that has been accumulated. In some embodiments, the overload percentage is decremented as well when the instantaneous power of the inverter falls below the maximum power level (resulting in a negative value).

Overload threshold (shed threshold)—In some embodiments, when the amount of accumulated overload (or percentage of overload capacity) exceeds the overload/shed threshold, the load control device sheds its load.

Critical threshold—In some embodiments, this threshold is an emergency shutoff threshold. In some embodiments, if the total instantaneous power of the inverter exceeds this critical threshold, then an overriding emergency shut off is performed and all loads are disconnected, regardless of the values of the other overload parameters.

Activate threshold—In some embodiments, this threshold indicates when a load control device reconnects its load (or group of loads) to power. In some embodiments, if the percentage overload is less than the activation threshold, then the load control device allows the load to be reconnected to power and to turn on and draw power from the inverter. In some embodiments, the activate threshold and shed threshold are set at different levels to allow hysteresis. The difference between the shed and activate threshold may be intelligently set to avoid toggling of the load shedding/activation back and forth.

Load/Frequency threshold—In some embodiments, this threshold is a frequency at which load shedding is performed. In some embodiments, the frequency threshold is interchangeable with a load threshold, as the measured frequency may be backed out or derived from the estimated inverter power/load because of the droop profile. As described above, the frequency of the power outputted by the inverter may be determined by the load control device. In some embodiments, if the measured frequency is below the threshold frequency, then the load is shed.

State of charge (SoC) of battery storage or energy storage system—Another example factor that may be used by a load control device to determine whether to shed its load(s) is the state of charge of a battery storage system connected to the house. For example, a load control device coupled to an air conditioner may be programmed to not run the air conditioner at all when the battery storage system is below 20% state of charge (where the threshold level is adjustable). Control of other loads such as hot water heaters may be also managed based on state of charge. In some embodiments, the inverter is configured to transmit or otherwise communicate the state of charge to the load control devices. For example, powerline communications, 900 Mhz communications, or wireless communications (e.g., WiFi) may be used to send the state of charge. In some embodiments, the inverter power electronics are configured to send a signature down the line, where the signature encodes the state of charge of the energy storage system.

Power Draw of Connected Loads—In some embodiments, the logic executed by a load control device for determining whether to shed a load is also based on the amount of power being drawn by the load connected to the load control device. For example, the current being drawn by the connected load is measured. The power being consumed by the connected load may is then combined with the input line voltage measurements (which are used to estimate the load state of the inverter, as described above) to determine whether to turn the connected load on or off (e.g., to shed the load).

In some embodiments, hysteresis for the load control devices may be set autonomously (e.g., to determine when to shed loads and when to reconnect them). For example, suppose that the load control device determines, based on current measurements, that the loads to which it is connected consume 4 kW (or that there was a drop in inverter load of 4 kW when the loads were disconnected). Based on the power consumption of the connected load, the load control device may autonomously set its activation threshold such that the loads are not reconnected or turned back on until the inverter has 4 kW less load than if the load control device were to turn on again. As shown in this example, in some embodiments, the load control devices are configured to determine whether to disconnect a load based on a measurement of the present electrical power being consumed by the loads that are connected to the load control devices.

In some embodiments, if the set of loads connected to a load control device is not drawing very much power relative to the overall system load, such that turning off/shedding the load does not reduce total system load by a significant amount, then the load control device determines that the load need not be shed and may remain active. This may be determined based on the power draw of the load being below a threshold value and/or the power draw of the load being less than a threshold percentage or proportion of the overall estimated load of the AC power source (e.g., solid state power source such as an inverter). As will be described in further detail below, in various embodiments, such parameters are tunable for enforcing a load shedding prioritization scheme. In this way, the determination of whether to shed a load may also be based on its potential impact on reducing overload. For example, some loads may be a nuisance to turn back on after being shed (e.g., may involve additional steps of manually resetting a device), and so the load control devices may determine to not shed a load if the impact of shedding the load on the load state of the inverter were below a threshold.

In some embodiments, load changes on the circuit are detected or otherwise determined by detecting changes in voltages and/or phase shifts on the line. When the home is on grid, load changes may be difficult to observe, as the power utility grid controls voltage tightly (that is, when on grid, load changes in the home have a minimal impact on voltage and/or phase of the AC power being delivered by the grid). When in off-grid mode, load changes are more easily detectable on the AC power line (where they may be determined based on detecting changes in frequency and detecting phase shifts). The detected changes in load may also be used to determine whether to shed a load.

Thus, as shown in the examples above, in various embodiments, the power values associated with the inverter that are estimated by a load control device according to the inverter model and by sensing the line voltages (and in some embodiments, frequency, phase, and/or current) are compared against various thresholds such as those described above to determine how close the inverter is to its limit. The closeness of the inverter to the limit is then used by the load control device to determine whether to shed its own connected load (where individual load control devices are making their own local determinations, independently of other load control devices).

As shown in the above examples, the steady state and transient power being delivered by the inverter is estimated (which is indicative of the load on the inverter) and used to determine whether to shed loads. Such power estimation may be used instead of, or in addition to, measuring frequency. The use of such power estimation provides sophisticated load understanding. This allows, for example, for more severe cases to be handled. For example, if only frequency were being measured, it may be difficult to respond quickly enough to severe transients. One example of such a transient is the transition from on-grid to off-grid, where the home transitions from being on grid (where the grid is supporting all the loads), to being off-grid (where the inverter is now the power source for loads that need power). For example, suppose that there is a large house that has 40 kW of potential load all at once in the worst case, and there is a 10 kW inverter for backup power. While the inverter may appear undersized, the load management techniques described herein allow the use of relatively small inverters because if the inverter is unable to handle all of the loads, loads are intelligently shed using the techniques described above. At the transition from on grid to off grid, suppose that there is 30 kW of load at the moment, where suddenly the grid power goes out and the relay connecting the home electrical network to the grid opens up and suddenly all of the 30 kW load is now on the inverter. It would be difficult for the inverter to handle such a load for any duration of time. The load switches described herein, coupled with the autonomous load shedding logic described above, are able to operate and shed load quickly. For example, they are able to detect that the inverter is becoming dramatically overloaded (e.g., by estimating instantaneous power draw, as described above), and are then able to react (e.g., based on specification of load shedding parameters, such as those described above), autonomously and quickly, to shed loads. This allows the inverter to then recover and continue to power the rest of the home without a noticeable interruption. The efficient and fast load shedding described herein facilitates a smooth transition from going from being connected to the grid to being powered by an ESS in backup mode (with power being delivered by the inverter), whereas if the load shedding took a longer time to occur, this would result in a period of blackout.

Thus, by being able to observe not only frequency or average load, but also the transient power load, which may be calculated as described above, faster reaction to events is provided.

Detecting Whether the Power System is on or Off Grid

When the home is off grid and in backup mode, the source of power for the house transitions from being the utility grid to the inverter (as the inverter is now the source of AC power in the home). In some embodiments, based on the sensor measurements captured by a load control device, the load control device determines whether the home is operating on-grid or off-grid. Such information may be used by the load control device to determine whether to perform load shedding. The following are further examples of determining whether a power system is on grid or off grid.

As described above, the load control device is programmed to make various sensor measurements, such as periodic measurements of line voltages (as well as frequency, phase, current, etc.) on an electrical circuit, to determine a load state of a power source (e.g., AC power source) such as an inverter. In some embodiments, the sensor measurements may be used by the load control program to determine whether the home is on grid or off grid. In some embodiments, the load control device may use the knowledge of whether an electrical network is operating on grid or off grid to affect its own behavior.

When the power system is in "on grid" (and power is being provided by a utility), the frequency of the AC (alternating current) line of the home's electrical circuit is controlled by the grid, where it is, for example, the spinning speed of generators on the grid that defines the frequency. This frequency is typically within a narrow band (e.g., narrow band around approximately 60 Hz in the United States, 50 Hz in other countries). In some embodiments, if the sensors of the power control device determine that the frequency on the AC power line is 60 Hz (e.g., using the techniques described above), then the power control device determines that the power system is in on-grid mode. If the frequency deviates (e.g., by some threshold amount) from 60 Hz, then the power control device determines that the power system is in off-grid mode.

In some embodiments, the deviation is quantified or specified as being outside of a predefined frequency window, where in some embodiments the predefined frequency window is preprogrammed and communicated to the power control devices by the load management module. The change in frequency may also be accompanied by a phase shift, which may also be detected by the power control device.

As described above, in some embodiments, the frequency of the power outputted by the inverter is controlled according to a frequency droop profile, where the frequency of the power being outputted decreases as the load on the inverter increases. For example, the inverter is programmed to lower frequency the more loaded the inverter is (and the more power it is delivering). As described above, the frequency of the power is determined, as described above, based on the voltage measurements that are periodically taken by a load control device. Typically, the utility grid in the US operates at 60 Hz. As the grid typically is not very responsive to load (e.g., the frequency of the power does not deviate much with increased load), in some embodiments, detection of power frequency going below a threshold value is a signal to a load control device that the electrical network is now off-grid (as the frequency would not decrease beyond the threshold level unless the inverter were now the AC power source, rather than the grid). For example, when the frequency is not 60 Hz, this is indicative of the network being off-grid.

In some embodiments, the load shedding logic described above is an execution mode that is entered into when it is detected that the electrical network is off-grid. In other embodiments, the load shedding logic is run continuously, regardless of whether the system is on-grid or off-grid. For example, the load control devices are programmed to measure the load on whatever is the AC power source (whether that is the utility grid or the inverter). That is, while load shedding may take on-grid/off-grid state as an input, in some embodiments, execution of the load shedding protocol is not necessarily specific to only when the electrical network is off-grid.

Thus, while load shedding is beneficial when off-grid in order to prevent the inverter from becoming overloaded, in some embodiments, execution of the load shedding algorithm described above is not specific to only when the electrical network is operating off-grid.

As described above, the load control devices are programmed with a model of an inverter that is used to estimate how much load is on the inverter. In some embodiments, the load control devices are programmed to assume that they are always monitoring the load on an inverter, regardless of whether the inverter is actually the AC power source at that time.

For example, in some embodiments, the frequency droop profile according to which the inverter controls its output is defined such that when the inverter is unloaded, the frequency of the power matches the frequency of the power delivered by the utility grid (e.g., 60 Hz). In this case, when the electrical network is on-grid, a load control device would see this as the inverter being unloaded, with steady behavior and without any frequency droops or phase shifts. In this case, when the home is on grid, the inverter model being run by the load control device would estimate that as there being very little or no load on the inverter (even though the grid is the power source, and not the inverter, the load control device believes that it is the inverter that is the power source whose aggregate load state it is monitoring). Here, the load control device would not perform any shedding, as it believes the inverter it is monitoring is unloaded (even though it is the grid that is currently the AC power source). However, once the home electrical network is disconnected from the grid, the inverter becomes the source of power. Changes in load on the inverter would then result in frequency changes, which may in turn cause the load control device to shed its load(s). However, the load control device has not changed its behavior on whether the system is on-grid or off-grid. Rather, when on-grid, from the perspective of the load shedding algorithm executing on the load control device, the load control device would observe no load on what it believes to be the power source (the inverter) based on the way the inverter is designed (e.g., which is designed to have a steady frequency at 60 Hz to coincide with the state of being unloaded). Here, when on-grid (which the load control devices would not necessarily be aware of), the load control devices, from their perspective, would view this as the inverter being unloaded, in which case, load shedding need not be performed, and their load may be kept at normal levels of full power.

As described above, in some embodiments, the inverter is intentionally designed such that if the net load on the inverter is zero or there is otherwise very little load, then this results in a frequency of 60 Hz (or a frequency that matches the grid) on the electrical network. That is, when relatively unloaded or unstressed, the electrical characteristics of the output of the inverter are similar or match to that of the power provided by the grid. For example, if there were 2 kW of load in the house, but a PV (photovoltaic) array is also producing 2 kW of solar power, then the net load on the inverter would be zero, and as the inverter is unloaded or not overloaded, the frequency of the inverter's output is designed to match grid frequency. In this way, when the electrical network is on grid, the load control devices would interpret this as there being no load on what it believes to be the inverter as the AC power source, and no load shedding is required. The system may also operate at 60 Hz (grid frequency) even if it is off-grid (because the inverter is unloaded or relatively unloaded, and is designed to have its output mimic the behavior of the grid when it is unloaded or relatively unstressed).

In this way, the load shedding algorithm is more generalized to monitor or estimate the load of any power source providing power to the home, and is reactive to whatever changes in load are detected for whatever AC power source the load control device is monitoring. If, for whatever reason, the grid frequency were to drop, this would be interpreted by the load control device as the AC power source being overloaded, and the load control device may shed its load to reduce the burden on the AC power source (which in reality is the grid in this case).

As described above, in some embodiments, based on sensor measurements, the load control device may use determined frequency as a way to determine whether the home is off grid or on grid. Various other techniques may be used to determine whether the electrical system is operating off-grid or on-grid.

In the frequency-based examples described above and below, there may be cases where the electrical network is operating off-grid, but the frequency of the power outputted by the inverter is at the grid frequency (e.g., because the inverter is unloaded). In this case, the load control device may not be able to distinguish, based only on frequency, whether the electrical network is on-grid or off-grid.

In other embodiments, the inverter is configured to send or broadcast a signal to the power control devices indicating that the electrical network is operating off-grid and that the inverter is now the AC power source for the loads in a home. For example, the inverter may fluctuate its voltage waveform in a particular manner that only occurs when the electrical system is off-grid. When the load control devices observe this particular pattern of fluctuation, then the load control devices determine that the electrical network is off-grid, regardless of the power frequency.

The following is another example, in which the inverter sends an explicit signal to the load control device indicating to the load control device whether the electrical network is on grid or off grid. As one example, the inverter uses frequency modulation to send a signal to the load control devices by a communications protocol such as power line communications (PLC). For example, a frequency offset from a known carrier frequency may be used to encode whether the network is on grid or off grid. For example, the frequency of the signal may be modulated to be between 900 Hz to 1100 Hz, where 900 Hz indicates that the system is off grid, while 1100 Hz indicates that the system is on grid. Such frequency modulation of a signal may be used to indicate other types of information, such as the stage of charge of the energy storage system.

The autonomous load shedding logic or behavior need not be disabled when the electrical network is on-grid or off-grid. In a frequency-based load shedding system, the grid frequency is unlikely to change when the system is on-grid, in which case the load shedding behavior is blocked naturally (or if there were frequency changes, they are typically short lived). If the AC output frequency were to change when on-grid, this may be indicative of collapse of the grid, in which load shedding may be beneficial in any event.

As described above, various techniques may be used to identify when the home system is off-grid, such as monitoring for intentional frequency variations introduced by the inverter, as described above, by monitoring for a signature voltage pattern superimposed by the inverter on top of the baseline sinusoidal voltage waveform that signals that the system is off-grid, etc.

As shown in the above examples, in various embodiments, load control devices are configured to autonomously determine the state of the electrical system, where there is coordination with the inverter. For example, the inverter is designed to behave in a manner that allows the load control devices to determine state information about the inverter. As described above, in some embodiments, the inverter is designed to send a specific type of signal indicating off-grid operation that the load control device is also configured to monitor for and interpret. In other embodiments, the inverter is programmed to control its output behavior based on the amount of power it is delivering (which is a reflection of how loaded it is). An inverter model is generated and distributed to the various load control devices that includes the mapping of output behavior to the aggregate or total amount of power being delivered by the inverter. Each load control device uses the inverter model to independently determine, given local electrical measurements of the line voltages, an estimate of the aggregate load on the inverter. Based on the estimated load on the inverter, the load control devices autonomously determine how to control power to their connected loads based on various thresholds and parameters, as described above.

In some embodiments, even if load control devices are configured to monitor for signals and electrical characteristics of the line that are indicative of the system being off-grid, the inverter concurrently sends an explicit signal to load control devices indicating off-grid operation as a form of redundancy.

As described above, while the load control devices may be configured to determine whether the electrical system is on grid or off grid, and the load control devices may be configured to use such information for load control optimization, in some embodiments, the load control devices may still be able to operate and autonomously determine whether to load shed, even in the absence of understanding of whether the system is on-grid or off-grid. That is, the load control devices are still able to autonomously perform load shedding to help the inverter from being overloaded, even if the load control devices do not realize that they are off-grid. The same decision logic may be executed regardless of whether the electrical system is on-grid or off-grid.

That is, in some embodiments, the load control devices will have a set of behaviors that is being executed regardless of whether the system is on-grid or off-grid. Here, the load control devices will be executing their load shedding or load control programming autonomously, regardless of whether the system is on-grid or off-grid. For example, even if the system is off-grid, this does not necessarily mean that the inverter is overloaded, and load shedding need not necessarily be performed.

In some embodiments, the on/off-grid determination may be used to determine modes of operation of the power control devices. For example, the load control program may be configured with logic to enter or exit different modes of operation based on a determination of whether a circuit is on or off-grid. In some embodiments, different modes of operation may be associated with different load control rulesets. For example, when the power control device determines that the circuit is off-grid, then the portion of the load control program pertaining to off-grid mode operation is entered, where power control instructions for off-grid mode operation are performed. Various techniques by which the power control device may determine that the home power system is operating in off-grid mode are described above.

The following are embodiments of load control rules that are applicable to when the home power system is in off-grid mode. In this example, a load control program for a power control device configured to control power to a hot water heater is described for illustrative purposes.

Suppose that the homeowner would like for the hot water heater to turn off immediately upon the power system going into off-grid mode. They may specify this via their mobile app. In this example, the load control program for the power control device that controls power to the hot water heater includes a rule such that in response to detecting the home being in off-grid mode, the hot water heater is disconnected from the circuit so that it is no longer a load on the circuit (e.g., the switch of the power control device is opened). As the hot water heater is turned off immediately when in off grid mode, without taking into consideration other factors such as estimated load on the inverter, this is an example of a more sensitive or responsive load shedding rule.

As another example, a rule is included in the load control configuration that is less sensitive to electrical events. For example, rather than disconnecting the load from the circuit immediately in response to detecting that the power system is in off-grid mode, the power control device is instructed to wait on disconnecting power to the load until another condition is met, such as the inverter load level exceeding a threshold (where the amount of inverter load may be determined based on power, frequency, etc., as described above).

As another example of a load control rule, when off-grid mode is detected, the power control device is configured, via its programming, to disconnect power to the load in response to a load step change that is of a threshold size. As described above, load shedding behavior may or may not depend on being off-grid. For example, load shedding behavior may be independent of whether or not the electrical network is on or off-grid. That is, in some embodiments, the logic for determining whether to perform load shedding is not necessarily dependent on whether the logic determines whether the electrical system is on or off-grid.

Thus, as described above, in some embodiments the load control program includes rules that specify, for given detected states of the electrical system, corresponding power control actions to perform. As described above, the state of the electrical circuit may be characterized or otherwise determined using various sensor measurements of the electrical circuit (e.g., voltage, current, frequency, phase, etc.). In various embodiments, the state of the electrical circuit is a function of capabilities of the battery storage system, the capabilities of the inverter, the loads on the electrical circuit, etc.

Further Details Regarding Frequency Based Load Shedding

As described above, in some embodiments, the load control devices are programmed or configured to shed load as a function of frequency. For example, by shedding loading based on frequency, the load control devices need not know whether the system is on-grid or off-grid. For example, as the detected frequency of the power being delivered by the AC power source drops (whether it is the inverter that is the power source or the grid that is the power source), the load controllers may start to shed load. When on-grid, it is unlikely that the frequency will drop, and thus statistically, the load controllers will very rarely, if ever, shed their loads. However, by basing load shedding on frequency, and not based on whether the system is on-grid or off-grid, if for some reason the frequency were to drop when the system were on-grid, the load controllers would still shed load (that is, their load shedding behavior is not limited to only when the system is off-grid, and is agnostic as to whether the system is on grid or off grid), which would help to prevent the grid from being loaded—in this case, if the frequency is dropping, then the entire utility grid is so loaded that it is collapsing (although this may be very rare in real life).

While load shedding behavior may be programmed to not be dependent on explicit knowledge of whether the system is on grid or off grid, the techniques described above provide a way to detect whether the system is on or off-grid, even without communications between the load control device and an inverter, allowing for behaviors based on knowledge of whether the system is on-grid or off-grid.

As described above, when on-grid, the frequency of the power being provided is unlikely to change. However, when the system is in off-grid mode, and the inverter is the power source, in some embodiments, the inverter is programmed to have large variations in frequency based on how loaded the inverter is (which may be determined based on the net power output that the inverter is trying to deliver to its loads, where the more loaded the inverter is, the more power it is trying to output to meet the demand for power). For example, the inverter may be programmed to lower the AC output frequency the more loaded it is. Thus, the load control devices may use the frequency as a proxy for understanding how loaded the inverter is (e.g., according to the frequency droop profile that the inverter uses, which is also included in the inverter model used by the load control devices).

In some embodiments, the load shedding programming of the load control devices need not be disabled when the system is on-grid, as the frequency is unlikely to change when on-grid, and the load control device is therefore unlikely to shed load. That is, when on-grid, the autonomous load shedding behavior of the load control devices is blocked by the steadiness of the frequency (which will deviate within only a narrow range, and variation is unlikely). Even if there were frequency variation in on-grid mode, it is likely to be short lived, where the frequency would quickly return to normal.

Further Details Regarding Reconnecting Loads

In some embodiments, the load control program includes instructions for re-connecting the load to power (e.g., closing the embedded switch in the load control device to bridge the circuit and the load).

As one example, the power control device may be programmed to reconnect power in response to determining that the home is back on grid (e.g., by determining that the frequency on the AC power line is back within the window indicating on-grid operation).

As another example, the power control device may be programmed to reconnect power while the power system is still in off-grid mode, but to wait to reconnect power until the inverter load is below a threshold (according to a specification of an inverter load threshold such as that described above). In this way, when the inverter has more capacity and has the capability to provide power to more loads, a load that had previously been disconnected may be re-connected to power.

In the above example of the water heater, if the water heater were running when the power control device cut off the power to it, after restoration of power, the electric water heater resumes its operation, without requiring resetting (that is, the power control device behaves effectively as an on/off switch when connecting/disconnecting the water heater from power provided via the home's electrical circuit). Air conditioning units behave in a similar manner. Other loads, such as certain appliances such as dryers, do not turn back on and resume operation when power is restored. When power is turned off to a dryer and turned back on, the dryer does not resume, and requires resetting. In some embodiments, for loads that are indicated as needing to be reset or restarted after having power re-connected, the load management module sends an alert to a user. For example, the notification indicates that the user's dryer had been turned off, but is now available if the user would like to restart it. In various embodiments, the notification is sent via the mobile application provided to the user, via email or text, or any other type of communication as appropriate.

The following is another example of how a power control device may be used to control power from a circuit to a load, beyond turning the power on or off. In some embodiments, the power control device is configured to modulate power to the load, for example, by performing dithering similar to as with a power converter.

While the power control devices may be issued commands by the load management module to control power in real-time (and on-demand), the generating and transmitting of preconfigured load control programs, according to which the power control devices operate autonomously, has various benefits. For example, in an off-grid scenario, an inverter could become heavily loaded very quickly, and there may not be an opportunity for the load management module to generate and communicate commands to the power control device to execute in real time. Here, using the preconfigured load control programs described herein, the power control device may intelligently and autonomously shed loads to protect or relieve stress on the power system, rather than, for example, allowing all loads to simply stay connected to use power and drain battery storage, or cause overheating of the inverter.

As shown in the examples above, a power control device operates according to a load configuration program that it executes. The load configuration programs (according to which the power control device operates) include monitoring logic for detecting the state of an electrical circuit (e.g., to determine the amount of load on a power source), as well as logic for determining what actions to take based on the electrical state. As described above, what actions the power control device takes, and when, may be determined according to various parameters and thresholds defined in the load control programs, examples of which are described above. For example, as will be described in further detail below, in some embodiments, a load's relative importance to another load is used to determine how sensitively or aggressively a power control device cuts off the power to its corresponding load (i.e., sheds its connected load).

Enforcing Load Shedding Prioritization via Load Control Programs

As described above, users may configure the prioritization of load shedding (e.g., via an app installed on a mobile device such as device 216). In some embodiments, load control configuration engine 218 is configured to translate the relative or global load shedding ranking or prioritization of loads into individual load configuration programs that are generated for each power control device according to the user prioritization. For example, the load control configuration engine has a global view of how loads should be controlled relative to each other, which the load control configuration engine encodes by generating the individual load configuration programs based on that global view.

In this way, even though individual load control devices shed loads autonomously, they may be programmed relative to each other so that some loads are shed faster or slower based on the global prioritization. This includes adjusting the aforementioned parameters (e.g., maximum power, overload capacity, overload threshold, critical threshold, activation threshold, load/frequency threshold, SoC, etc.) in the load configuration programming/profiles by the load management module (which has a global view of the loads) that are transmitted to individual load control devices.

For example, while the line voltages of the inverter observed by the load control devices would be the same, and the load control devices would estimate the same state of loading on the inverter AC power source (because the load control devices are programmed with the same inverter model), the threshold or parameters by which load control devices determine whether and/or when to take actions such as shed load may be programmed differently for different load control devices. For example, the parameters and thresholds for performing an action may be set differently for different load control devices, causing one load control device to react more quickly than another load control device for the same estimated inverter load state.

One example way of having one load control device react sooner than other load control devices (e.g., shed its loads before other load control devices shed their loads) is to provide different overload capacities to different load control devices. For example, one load control device may be programmed with a lower overload capacity (indicating to the load control device that the inverter is more fragile), while another load control device is programmed with a higher overload capacity (where this load control device is instructed that the inverter is more robust). The load control device that is programmed with the lower overload capacity will then be caused to shed its loads sooner than the other load control device programmed with the higher inverter overload capacity (as it will have a lower threshold for acting).

Another way of establishing or enforcing prioritization is to provide different overload/shed thresholds to different load control devices. As another example, all of the load control devices may be given the same overload threshold, but programmed with different inverter overload capacities. For example, as described above, the overload capacity defines how quickly a device accumulates "overloadedness." Having two devices with different values for this parameter would result in one load control device reaching the overload threshold (shed threshold) before the other, causing it to shed its load earlier.

As another example, if enforcing a global prioritization via load control configurations, different load control devices may be provided different values for the maximum sustainable power level for the inverter. As one illustrative example, suppose that a homeowner has a 10 kW inverter. In this example, the homeowner wishes to always have 5 kW of headroom in case their dryer turns on. As one example of ensuring that there is 5 kW of headroom, the load control device connected to the air conditioner may be programmed such that its model of the inverter has a maximum power level that is set at 5 kW (rather than the actual 10 kW maximum that the inverter is rated to operate at). In this way, the air conditioner will turn off at the 5 kW threshold, preserving the desired 5 kW head room.

As another example, suppose that all of the loads are considered equal, where one load control device need not leave room for other loads. However, the homeowner would like some loads to be disconnected first to see if that will allow other loads to stay on. In this example, the load control devices connected to loads that should be disconnected first are programmed to react faster. This may be done by having such load control devices programmed with smaller overload capacities for their inverter model so that they reach a local estimate of an overload condition more quickly, causing them to shed their loads earlier than other load control devices that are programmed with larger overload capacities. In this example, after the load control devices with smaller overload capacities shed their loads, this may result in the load on the inverter being reduced to a point where it is below the maximum power threshold values defined for the other load control devices, in which case the overload percentage begins to decrease.

As another example of prioritization, different load control devices may be programmed with different frequency thresholds (which may be derived from average power thresholds). For example, if two load control devices were given the same threshold frequency, then when the estimated or observed power frequency dropped below that threshold, then both load control devices would perform load shedding. Rather than have both load control devices with the same frequency threshold, it may be beneficial to have one load control device have a threshold with a higher frequency value. In this way, the load control device with the higher frequency threshold will be caused to shed its load first (as its value will be reached first as the inverter becomes more loaded in the case of an inverter frequency droop profile as described above, where the frequency of the output of the inverter drops as inverter load increases). This allows time to determine whether this addresses the issue of overload while also allowing the other load (connected to the load control device with the lower frequency setting) to see if it can stay on.

As another example, a configurable time scale component is also included as a parameter in the load configuration programs according to which load control devices operate, where load control devices may be provided with the same frequency thresholds, but with different time scales. For example, a load control device may be configured to turn off if the measured frequency is below the frequency threshold for at least a threshold period of time (e.g., one second), whereas another load control device is programmed with the same frequency threshold, but with a different threshold period of time (e.g., five seconds). Thus, when the first load control device sheds its loads, if the frequency of the inverter rises (because the load has lowered because the load is no longer drawing power), then the second load control device need not shed its load (meaning that load was able to stay on, and its functioning was not interrupted by having its power cut).

Thus, as shown above, programming individual load control devices with different values for parameters such as overload capacity, overload threshold, maximum power, frequency threshold, etc. allows a global load shedding priority to be created and enforced, even as the load control devices operate autonomously and independently of each other. As shown in the above examples, the inputs to the load shedding decision logic are the total instantaneous inverter power, the average inverter power, and/or the transient inverter power. The point at which the load control device decides to shed load may be managed by adjusting the various load parameters/thresholds for different load control devices. The setting of such parameters for various individual load control devices may be determined according to a global prioritization scheme. The output of the decision logic is an instruction on how to modulate power to the load (e.g., where the switch should be on or off, or whether to perform power modulation, such as analog DC power adjustment).

The following are further embodiments of enforcing load shedding prioritization. As described above, in some embodiments, a user may configure prioritization of load shedding, for example via an app installed on a mobile device such as device 216. In some embodiments, the load management module receives the user's load shedding prioritization via device 216. In some embodiments, the prioritization specified by the user is enforced by orchestrating the generation of the load control configurations for each power control device such that, in aggregate, the local behavior of the power control devices relative to each other will map or otherwise correspond to the user's desired global load shedding prioritization.

As described above, the rules in the load control program may be configured to specify when, and under what conditions, the power control device should perform load shedding. The conditions for triggering load shedding may be adjusted by adjusting the above mentioned load shedding parameters/rules in the load control programs/rules.

As another example of using adjustment of load shedding parameters to control how load control devices react, consider the inverter overload threshold parameter described above. Load shedding of a device may be delayed by adjusting the threshold level at which load shedding is triggered, where the overload threshold indicates how heavily the inverter is stressed or overloaded. For example, the inverter overload threshold may be set such that the power control device is programmed to perform load shedding when it is detected that the electrical network is off-grid mode, even when the inverter is not stressed. Shedding of unimportant or low priority loads in this manner may be performed, for example, as a proactive measure to prevent stressing of the power system when off-grid. On the other hand, if a load is important and should be made to stay powered for as long as possible, even when off-grid (e.g., because the load is a medical device), the threshold level for inverter load may be set at a value corresponding to a more heavily stressed level, such that the load is not shed until the inverter is in a more critical state, and is more heavily stressed.

Thus, in this way, shedding of an important load (e.g., a load for which it is important to stay on as long as possible, even in off-grid mode operation) may be triggered when the power system is in a more critical state (e.g., the inverter is more heavily loaded or stressed), whereas shedding of a less important load is triggered when the inverter is in a less stressed state. As another example, for a same observed state of the power system, a power control device connected to a lower priority load may be instructed to shed its load, while a power control device connected to a higher priority load is not, where the power control device is provided programming that delays shedding of the higher priority load until the electrical network reaches a more critical state (where the critical state may be defined via specification of particular values for various thresholds such as those described above).

As another example, for a load that is prioritized to be shut down quickly, the load control program for a corresponding power control device is configured to shed its load in response to relatively smaller load changes. That is, an unimportant device is not shed immediately upon the power system going into off-grid mode, but may be controlled and made to jump offline at the first sign of a potential overload situation, whereas a high priority load is not shed, and where the power control device for the higher priority load will have, in its programming, a different overload threshold (e.g., higher state or level of stress on the electrical network) before cutting power to the higher priority load. This is one example way of using differently configured load control programs/profiles to create an effective delay in cutting power to the higher priority load relative to the lower priority load (and thereby enforcing the prioritization of shedding of the two loads). In this example, the preconfigured load control programs allow for low priority loads to be disconnected first, where a determination of whether shedding of the lower priority load mitigates the risk of overloading may then be made. As described above, the relative delays in shedding of different loads may be implemented by adjusting load shedding conditions or threshold parameters in the programming for the different power control devices connected to the loads.

Thus, as described above, the conditions under which a power control device sheds load (by disconnecting a load from the home's electrical circuit) may be adjusted, where load shedding may be initiated or triggered for different devices at different times or under different conditions by implementing different threshold conditions under which given load control devices shed their loads. Thus, the shedding of a load can effectively be hastened or delayed relative to other loads by performing relative adjustment and specification of the load shedding parameters included in the load control programs transmitted to the power control devices connected to those loads.

As described in the examples and embodiments above, in various embodiments, the prioritization of load shedding specified by a user, as described above, is used as an input when generating individual load control programs for the multiple power control devices involved in the ranking. This includes, for example, generating, based on the load prioritization, different load control programs/rules for different power control devices that cause load shedding to be triggered at different points or states or conditions of the electrical network (e.g., where shedding is triggered for different loads at different levels of inverter "loadedness" according to the prioritization, as described above). In this way, generating one load control program for a power control device is dependent on the load control program generated for another power control device. For example, the threshold conditions for triggering shedding of different loads in a group may be defined or adjusted relative to other loads in the group so that they will be shed according to the manner in which they were prioritized or ranked.

Based on the preconfigured load control programs, even when operating autonomously according to their individual load control programs, because the load control programs were generated according to the global prioritization or view that takes into account multiple loads, the power control devices will shed their loads relative to each other in a manner that complies with or is otherwise consistent with the user's desired prioritization of the loads. For example, a lower priority load may be caused to be shed sooner than a higher priority load, whose shedding is relatively more delayed (e.g., where the higher priority load is attempted to be kept connected to power for longer than the lower priority load).

Characterizing Loads

In the example of FIG. 2, load management module 202 includes load characterization engine 220. Load characterization engine 220 is configured to characterize the loads connected to the home's electrical circuit. Characterizing a load includes determining how much power a load draws, how much power is shed when the load turns off, etc. In some embodiments, characterizing the load includes identifying load types, load sizes, how often the device is run, etc. The load characterization may be further used to optimize energy usage and consumption.

The following is an example of characterizing the loads in a home. In some embodiments, sensors are placed at the electric meter of the user's home. The total electrical usage of the home is monitored. The sensors determine the electrical patterns in the house by monitoring the home's electrical network. Whenever the power goes up or down in a step change, this is typically because a device is being turned on or off. In some embodiments, the load characterization engine evaluates the sizes of the step changes to determine the sizes of various loads. In this way, loads may be identified. For example, by evaluating the electrical usage at the meter, it may be determined that there is a device that has a 4 kW load, with a 10 kW in-rush for half a second every time that it is turned on.

In some embodiments, the loads that are detected at the meter are mapped to loads connected to power control devices. For example, a power control device can be used to determine when a load was turned on or off (where the switch of the power control device is closed and the load device is connected to the electrical circuit and able to receive power). The time of the load device turning on or off is correlated with the time of a step change observed at the meter. It is then determined that a load type with a certain load size corresponds to the load connected to a particular load control device.

In some embodiments, a power control device is configured to characterize the loads that it is attached to. For example, the power control devices is configured to use electrical measurements (e.g., via current voltage sensors) to determine what loads are attached to them (e.g., at their output, or the side of the power control device that interfaces with a load or group of loads being controlled). As one example, the power control devices detect patterns in current or voltage. In some embodiments, these current-voltage patterns are sent to the load management module for analysis, where, for example, machine learning is used to classify loads based on their current-voltage profiles. In other embodiments, the load management module infers a type of load present in the house based on the characterization of a load.

In some embodiments, the characteristics of the loads are used to further refine and more intelligently determine how to control the power to those loads. For example, the load shedding sensitivity configured in load control programs as described above may be determined based on the size of the inverter relative to the size of the known loads in the home. For example, if the inverter is small (e.g., it is rated for a relatively low power output), and there are several large loads in comparison, then the load control programs may be made more sensitive (e.g., by adjusting thresholds such as overload capacity, maximum power, etc., as described above) to cause loads to be shed earlier and more quickly to reduce stress on the inverter (where smaller inverters are more easily stressed because they are smaller and have less capability to provide power as compared to a larger inverter).

In some embodiments, rather than the user prioritizing the loads manually, the load control configuration generation engine, based on the labeling/classification of the types of load and/or characterization of the type of load (where the label may be used to determine an estimate of the size of the load), automatically prioritizes the loads, or provides a suggested load prioritization to the user. In this example, the load management may generate the load control programs for the individual power control devices without requiring the user to specify prioritization at the granularity of individual loads.

Additional Examples of Load Management

In addition to being used to perform load shedding, the power/load control devices may also be used for other types of load management, such as load optimization, time of use arbitration, etc.

Load Optimization

As described above, in various embodiments, the preconfigured load control programs sent to power control devices include programs or logic for performing load shedding. The load control programs may also include logic for other types of load management. As one example, the load control program includes logic for load optimization, as will be described in further detail below.

For example, in addition to facilitating intelligent load shedding to, for example, prevent overload, the intelligent power control devices described herein are used to optimize energy usage and efficiency. For example, by being able to control loads (e.g., turn them on or off, reduce power, or otherwise modulate power to the load(s)) electronically via software, the overall power system may be optimized.

In some embodiments, the load management module includes a load optimization engine 222. The load optimization engine is configured to optimize usage (e.g., efficiency of the usage) of various power sources and producers in the power system. In some embodiments, the optimizations are encoded in the preconfigured load control programs.

In some embodiments, optimizing energy usage includes transmitting commands to power control devices to be executed in real-time to control whether specific loads or groups of loads are on or off (or to otherwise manage the power delivered to loads).

Optimization of Excess Solar Power

For example, the usage of excess solar power may be optimized using the load control techniques described herein. As one example, suppose that a home generally has excess solar power later in the day that goes unused, because the battery storage is typically full by that point. Typically, in existing systems, if there are no loads to consume the excess solar power, and there is no more capacity in the battery storage to absorb the excess solar power, then the excess solar power is sent to the grid. However, the homeowner may not be paid for the excess solar power sent to the grid (e.g., because the rates are reflective of the fact that the solar power would not be helpful to the utility). Using the load management techniques described herein, the excess solar power may still be utilized, rather than wasted. For example, the excess solar power is distributed or time shifted by converting it to other types of energy storage. The time shifting of the excess solar power is performed, for example, by controlling loads that are not time sensitive to absorb the excess solar power for later use, preventing the excess solar power from being wasted, and thereby improving the efficiency of the usage of the photovoltaic (PV) power.

As one example, consider a hot water heater that has been off all morning. In some embodiments, the intelligent power control device controlling power to the water heater load may be instructed (e.g., via a real-time or on-demand command from the load management module) to turn on and heat the water in the water heater when there is excess solar power so that the water heater can absorb the excess energy and heat hot water to be used at a later time. For example, the load optimization engine determines the presence of excess solar power. In response, the load optimization engine transmits a real-time signal or instruction to the power control device connected to the hot water heater to turn the hot water heater on (by connecting it to power from the home electrical circuit or network). In this way, the excess solar energy may be stored thermally, where the hot water may be used later on in the evening.

On the other hand, if the hot water heater happens to be on, and the load optimization engine determines that there is currently not excess solar, and has identified the water heater as a load that can be turned on at a later time, the load optimization engine sends a real-time signal to the power control device instructing it to turn off the water heater for now (e.g., until excess solar power is detected, at which point the load optimizer sends an instruction to the load switch to turn on the hot water heater). That is, the power control device is used as an on/off switch for the hot water heater, and controls when the hot water heater is on or off so that water is heated when there is excess solar power, and is prevented from operating at other times.

In this way, the usage of some of the solar energy is time shifted, where the solar energy is stored thermally in the water, and where the heated water may be used at a later time (compared to when the excess solar energy was generated). By controlling when and how the excess solar power is used, the power system described herein optimizes the value of the energy that is produced and consumed. This is one example of how the behavior of the power system can be optimized using the intelligent load switches described herein, even when the home is on-grid.

As another example, similar energy optimization with respect to excess solar power is performed by intelligently controlling air conditioning. For example, air conditioning may be turned on/off based on an intelligent power optimization strategy, where an intelligent power control device connected to the air conditioning is programmed to turn on the air conditioning at maximum when there is excess solar energy to cool down the house. In this way, later in the evening, when energy from the grid is typically more expensive, the homeowner does not need to run their air conditioner as much, as their home was pre-cooled ahead of time, using the excess solar energy that otherwise would have been wasted and gone unused.

Excess solar power may be directed to other types of storage as well. For example, when excess solar power is determined to be present, a load control device connected to a car charger is used to control power to a car being charged such that it is charged using the excess solar power, rather than from grid power.

Time-shifting of excess solar energy using the techniques described herein provides various other benefits as well. For example, by storing solar energy (that would otherwise have been wasted) in other forms, such as thermally (e.g., by heating water in the hot water heater, or using it to cool or heat a home pre-emptively), the power system can be designed with a smaller amount of battery storage (as the battery need not be relied upon as much to heat water or cool/heat the home). That is, the home's temperature and hot water are used as thermal energy storage, allowing the homeowner to maximize the value of their power system with fewer batteries. This reduces the cost of the power system needed to power the home (as additional batteries are not needed to capture excess solar energy), or, for the same sized system, more value may be extracted.

In some embodiments, the load control devices perform the time shifting autonomously (without requiring an explicit instruction from a central hub to do so). For example, the time shifting may be programmed via load shedding settings. As described above, a load control device is configured to estimate or otherwise determine the load on the inverter. If the load is determined to be negative (e.g., by using the techniques described above), then this is an indication that there is excess solar power (as there is a net negative load, where the solar power exceeds the demands of the loads in the house). In this example, the load control device coupled to the hot water heater is programmed to turn on only when the load on the inverter is negative (indicating that the solar panels are out-producing the loads in the house and that the inverter is absorbing power and storing it in batteries potentially), or more negative than a threshold.

Figure 4:
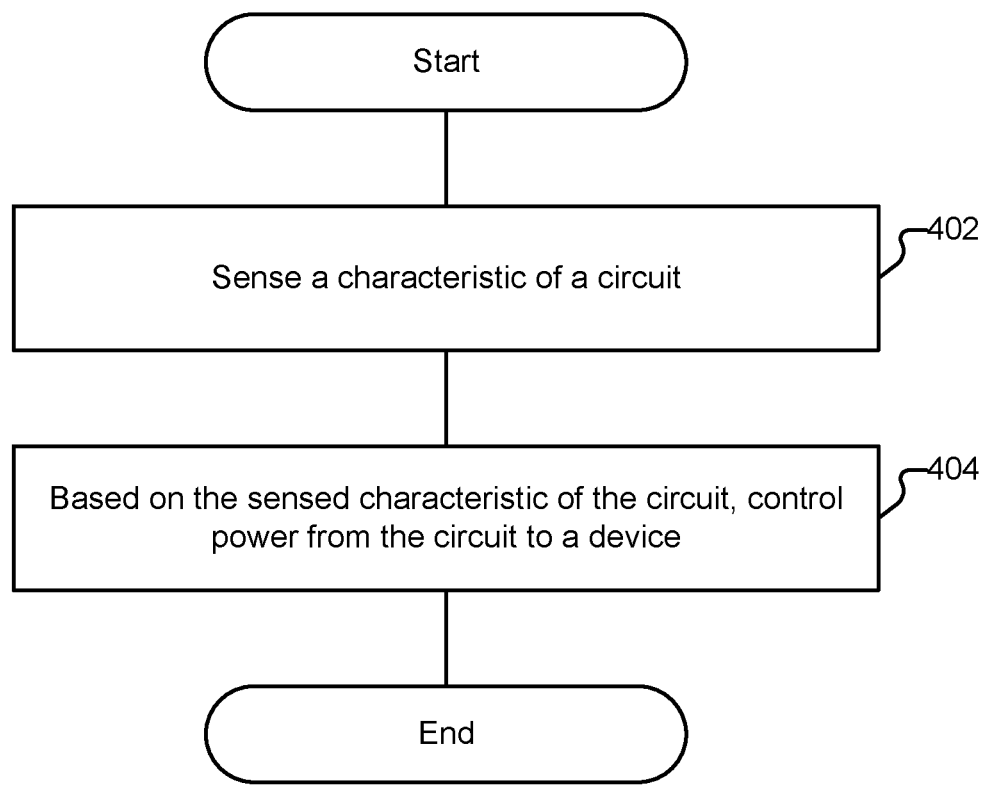
FIG. 4 is a flow diagram illustrating an embodiment of a process for controlling power from a circuit to a load device.

FIG. 4 is a flow diagram illustrating an embodiment of a process for controlling power from a circuit to a load device. In some embodiments, process 400 is executed by a power control device such as power control device 300 of FIG. 3 or the hub of FIG. 6. The process begins at 402 when a characteristic of a circuit is sensed. For example, as described above, electrical measurements of the circuit are made, such as voltage, current, frequency, and/or phase measurements.

At 404, based on the sensed characteristic of the circuit, power from the circuit to the device is controlled. In some embodiments, controlling power from the circuit to the load includes actuating a switch. For example, the sensed characteristics of the circuit are indicative of a state of the circuit. As one example, according to a load control program, the state of the circuit may indicate that load shedding should be performed. In this case, according to the load control program, a switch is caused to be opened, disconnecting the load from power, thereby shedding the load. For example, as described above, using the electrical sensor measurements, as well as an inverter model, the load controller estimates the state of the inverter (or the state of the power source that is currently delivering power). This includes determining whether the inverter is overloaded (e.g., by using the various parameters such as maximum power, overload capacity, overload threshold, critical threshold, load threshold, etc. described above to determine whether the power being outputted exceeds a threshold, that the frequency of the power deviates from a baseline frequency by a threshold amount, etc.). Based on the determination of the amount of loading on the inverter, the load control program determines whether to modulate power to the load, such as shutting off the load from power. In some embodiments, the load control program is generated using a process such as process 500 of FIG. 5, described in further detail below. Further details and examples regarding load control programs and controlling power from the circuit to a load (or group of loads) are described in further detail above.

Figure 5:
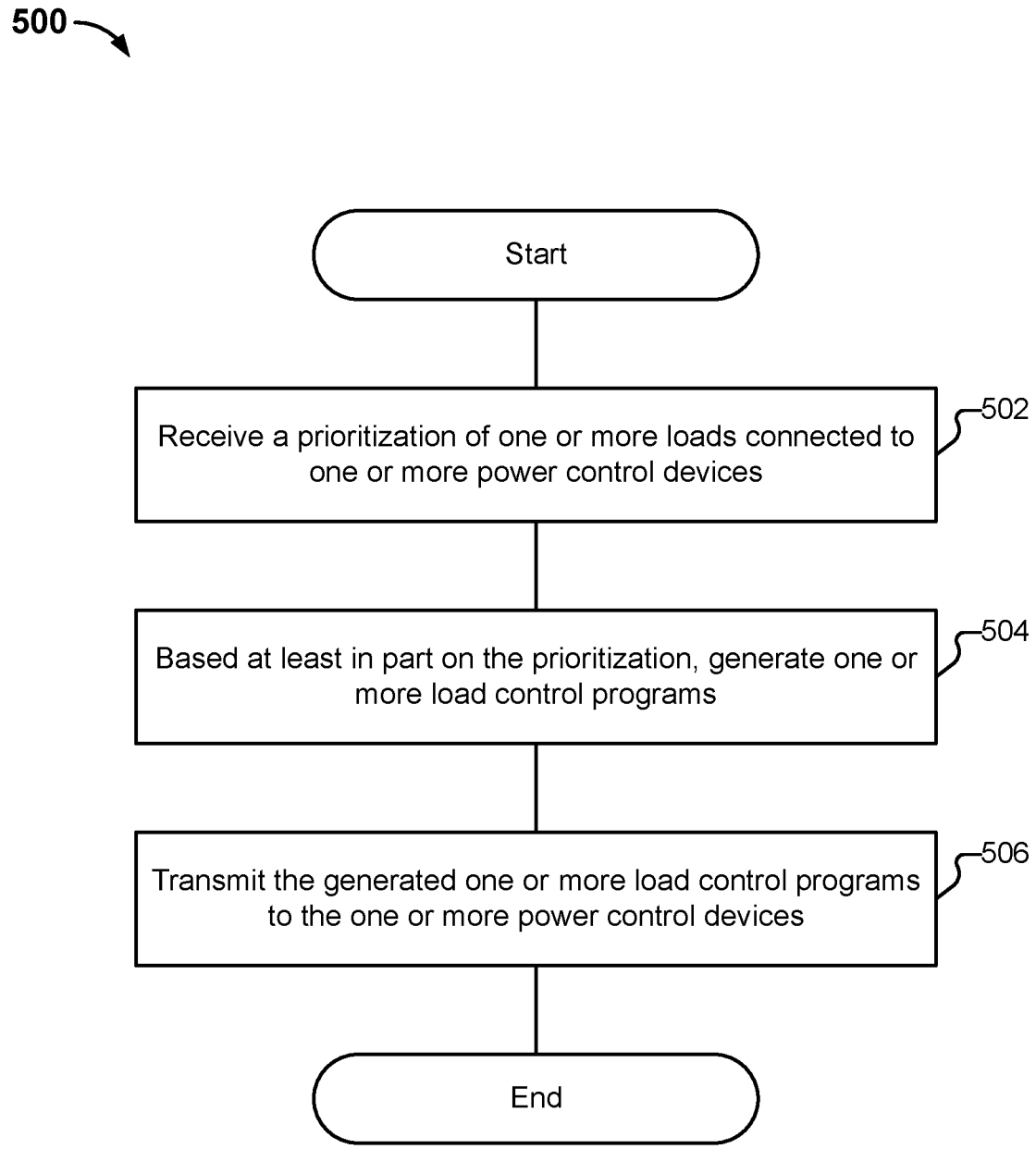
FIG. 5 is a flow diagram illustrating an embodiment of a process for providing load control programs.

FIG. 5 is a flow diagram illustrating an embodiment of a process for providing load control programs. In some embodiments, process 500 is executed by load management module 202. The process begins at 502 when a prioritization of one or more loads connected to one or more power control devices is received. At 504, one or more load control programs are generated based on the prioritization. For example, the prioritization is used to determine different load shedding parameters/thresholds for different load control devices in the system. At 506, the generated one or more load control programs are transmitted to the one or more power control devices. The power control devices may then control power from an electrical circuit to the loads according to their load control programs, such as described above in process 400 of FIG. 4.

As described above, the load management techniques and software-driven load control devices described herein provide various benefits. For example, even if loads in a user's home are not necessarily large in the sense that they overload the battery system all at once, there may be electrical loads that are reasonably sized in terms of power, but are on continuously, consuming a large amount of energy. Sizing a home backup system to be able to supply the energy for all of these loads would require a large amount of solar panels and battery storage. The intelligent load management techniques described herein provide the option to simply not use such loads during backup. By allowing for specific loads to be selectively turned off during a backup scenario (e.g., where the power system is off grid and energy is being supplied from the battery storage), a backup system can be designed that is much smaller in size, and much less expensive. Thus, using the load management techniques described herein, the experience of having a large backup system that is capable of backing up every load associated with the home can be achieved with a much smaller-sized system.

Load Control Hub

Figure 6:
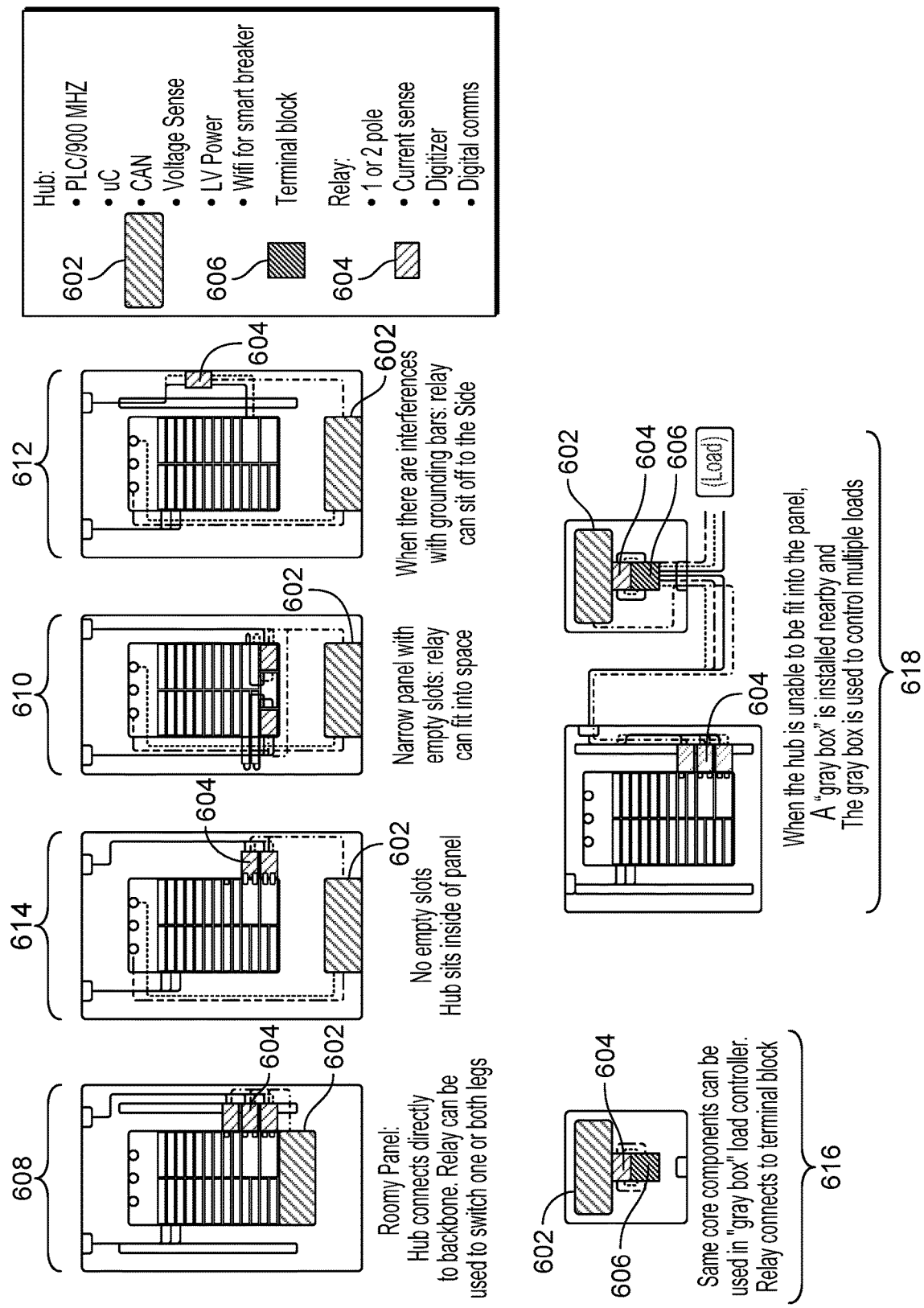
FIG. 6 illustrates embodiments of load control hubs.

The following is an embodiment of a power control device referred to herein as a "load control hub." FIG. 6 illustrates embodiments of load control hubs.

In homes where electrical storage systems (ESS) are installed, one of the goals of such systems is to provide backup power to various appliances and circuits within the home. In this way, in the event of a grid outage, the home can isolate from the rest of the grid and also be able to power all of the various devices within the home.

However, it is the case that homes are configured to have very different kinds of loads. For example, people may have multiple freezers, very large air conditioners, heat pumps, pool pumps, etc. If all of these devices are run at the same time, it is likely that the power capacity of the ESS will be exceeded, which will cause a local blackout within the home because a breaker will be tripped.

One existing practice is to move some loads to a backup network. The backup network will include items such as refrigerators or other loads that are considered to be critical so that in the event of an outage, those loads will be provided energy from the ESS without exceeding the total power capacity of the ESS.

There are various challenges to such existing practices. One is that power is only provided to those specific loads that have been moved. Another drawback is that the installation time of moving loads may be long, as it may involve rewiring a panel to move a dryer, refrigerator, etc. from one panel to a new panel that is being installed. This is a time-consuming process, as even after the loads have been moved, further testing is required.

One approach to addressing such challenges is smart breakers, which replace the breakers that are in a home's electrical panel, and which include logic and communications that can be configured to perform actions such as selectively isolating loads (e.g., for performing load shedding). Existing smart breakers have various challenges. One is that many existing smart breakers rely on WiFi communications, which may have issues with robustness. Another issue with existing devices is that because they serve as safety devices for the electrical circuit, they must undergo extensive (and expensive) qualification testing. Thus, existing smart breakers may be a non-ideal solution from a reliability standpoint because of the aforementioned communications issues, where certification may also be a challenge. Another challenge with existing smart breakers is that they are largely standardized in terms of their size and the panels with which they interface to. However, panel dimensions are not always standardized, in which case existing smart breakers may not be able to interface with them.

Described herein is a load control hub device/architecture that allows for loads to be selectively removed or isolated from a panel, so that exceeding the power capacity of the ESS is prevented. The load control hub device/architecture described herein may also be used to perform other processes, such as time of use arbitration, where the time of use of a particular load may be shifted. In this way, when loads are available may be controlled. Further embodiments of time of use shifting are described above. As another example, the load control devices described herein may be used for emergency load direction programs, where particular loads are shed when requested from a utility.

FIG. 6 illustrates embodiments of load control hubs. In some embodiments, the load control hub device includes two components. One component is a hub (e.g., hub 602). In some embodiments, the hub is a device that communicates over a protocol such as PLC (powerline communications) to the ESS (e.g., PLC and 900 MHz communication with the electrical storage system). As described above, in some embodiments, the ESS includes an energy or load management system, which manages loads via load control devices such as those described above, and the load control hub described herein.

In some embodiments, the hub also interfaces to one or more relay devices 604. As one example, the relay devices fit or sit on, or are coupled to the back of an existing breaker in the panel. In some embodiments, a relay device interrupts the circuit, isolating the breaker from the home power (e.g., the L1 and L2 lines that are coming in through the panel).

The following are examples of using such load control hubs. Suppose that the ESS (not shown in the example of FIG. 6), is installed in the home and detects that there has been a grid outage. The ESS may be configured with information to determine that a particular appliance, such as a large air conditioner, will exceed its power capacity. In some embodiments, in response, the ESS commands the hub to isolate the air conditioner. The hub then in turn receives the command over a communications protocol such as PLC. The hub then in turns sends a command (which may be either a digital or analog signal) to the relay attached to the air conditioner load. The relay then in turns opens the associated circuit so that the air conditioner is no longer able to turn on for the duration of the outage.

In this example, the hub includes various intelligence and logic (e.g., via microprocessors, communications, sensors for measuring electrical characteristics such as voltage, current, phase, frequency, etc.), while the relay may be a relatively simplified device or piece of equipment that, for example, includes a one or two pole relay with a current sensor. In some embodiments, the relay includes a digitizer. The relay may be easily installed as a switch that is in series with an existing breaker, where the relay is controlled by the hub. In contrast to existing smart breakers, the relay may be retrofitted or added on to an existing breaker, without requiring the certification that is needed for existing smart breakers. Further, the relays are relatively inexpensive and not as complex as compared to existing smart breakers, which may include various components such as WiFi controllers, microcontrollers, power supplies (e.g., to be isolated from the rest of the circuit). Rather, any communications complexity or intelligence is packaged into the hub. In some embodiments, the hub/relay(s) are a distributed form of the load control device described in conjunction with FIG. 3.

For example, an existing smart breaker system may include a host of devices that have individual power supplies and microcontrollers. In contrast, in the load control hub architecture described herein, such componentry is localized into a single hub, where there are then switching mechanisms populated for as many relays as desired.

The hub may communicate with the relays via various types of communications. As one example, the hub may communicate with a relay via a digital signal interface such as a serial interface or a CAN (Controller Area Network). The interface may also be analog. For example, the signal may cause a relay control line to be pulled high or low (e.g., control via a single wire with a one bit signal that indicates "open" to remove load from the system).

The relays may be configured with default states, where the default state may be dependent on the type of load connected to the relay. For example, a relay may be default open, default closed, or bi-static so that there is no holding current.

FIG. 6 illustrates embodiments of various installation options for the load control hub described herein. In one embodiment, the hub and the relay are designed to fit within a standard breaker slot. This allows for the load control hub to be flexibly installed in different configurations, depending on the amount of available space within a panel, which may vary widely among homes.

In the installation embodiment at 608, relays are physically hung off of breakers. For example, a metal bus bar may be placed between a screw terminal on a breaker and a screw terminal on the relay. In other embodiments, the breaker and the accompanying relay are connected via a wire. One example advantage of this option is that the wiring may be cut to length, minimizing installation time. In this example, installation is relatively simplified, and may involve simply disconnecting the main service line, disconnecting the original wire that is wired into the breaker, inserting or attaching the relay, fastening the relay (e.g., by screwing the relay on), and then taking the original wire and attaching it to the relay.

In the example installation embodiment shown at 610, a relay sits within an open breaker slot, where there is a jumper wire between the breaker and the relay. This installation option is beneficial in cases where there are long breakers (e.g., because they include ground fault detection interrupt circuitry, or arc fault circuitry), and there is insufficient space to hang a relay off of the side of the breaker. In this example shown at 610, the relay is placed down below directly underneath in a spare breaker slot.

Another example installation embodiment is shown at 612, where a relay is wired in separately, where an available space within the panel is found to hang the relay.

As shown in these examples, the relays are connected to the hub via a wired connection, such as a two-to-four wire connection (where the wire count may vary depending on the implementation of the communications between the hub and the relays). As one example, the hub is individually connected to each relay (e.g., if there are 16 relays, then there are 16 wires going from the hub to the relays). In some embodiments, analog signals are transmitted with appropriate signal conditioning.

As another example, CAN may be used, where the relays include CAN transceivers. In this case, an architecture such as a star architecture may be used, where there need not be separate wires going to each relay. Instead, the relays may "piggyback" off of each other. In a CAN, as many devices as needed may be plugged in, without requiring having separate cables coming from the hub to go to each of the relays. In this case, a backbone or network is provided, where as many devices as desired can be plugged in. In this example, an addressing scheme such as CAN addressing may be used to send control signals to individual relays, where the relays are individually addressable. When a relay recognizes that a message to turn off has been directed to it, then the relay opens its switch in response.

The following are examples of installing the hub portion of the load control hub described herein. As one example, the hub is designed to grab the stabs off of the backplane in the panel. In this way, the hub can both receive power, as well as measure site voltage. Measurement of the site voltage may be used to determine whether the home has been isolated from the grid. This also allows for ease of installation. The hub may be implemented to be of various sizes, such as the size of a double wide breaker, or the size of a relay. When the hub is in the form factor of the breaker, it may be installed into a slot in the panel in a manner similar to installing a typical breaker.

In the example shown at 614, the hub is placed at the bottom of the panel. In this example, there are no open breaker slots, and the hub cannot be connected directly to the backplane. In this example, the hub is wired to the lugs at the top of the backplane.

As described above, in some embodiments, the hub includes sensors to measure electrical parameters such as voltage. In other embodiments, phase and frequency may also be measured. The hub may then use these measurements of the characteristics of the circuit to isolate devices and manage loads, as described above.

In some embodiments, the hub includes a WiFi server. The inclusion of a WiFi server allows smart breakers to be accommodated. As one example implementation, the hub acts as a gateway, such as a PLC to WiFi gateway. For example, the ESS communicates to the hub over PLC, where the hub then communicates with smart breakers over WiFi. As the hub is installed within or near the panel in which smart breakers would be placed, this reduces the likelihood of a poor wireless connection to the smart breakers, and increases signal reliability and robustness. Thus, both the simplified relays described herein, as well as smart breakers are accommodated by the load control architecture described herein. For example, the use of smart breakers may be desirable for more complicated loads, such as those that are toggled on and off frequently, where more precise metering is desired, etc.

As described above, in some embodiments, the hub communicates with the ESS (e.g., energy or load management system included in the inverter of the ESS). Various architectures may be used. As one example architecture, the hub is configured to execute commands provided to it by the ESS. For example, the ESS may include logic to determine what specific loads are to be isolated. The ESS then sends an instruction or command to the hub to disconnect a certain load (e.g., to disconnect the air conditioner, disconnect the electric range, etc.). In this example architecture, the hub then executes the instructions it has received from the energy or load management system of the ESS. Here, the hub executes isolation commands based on commands from the inverter. The inverter then also has visibility into what loads have been shed at any given moment in time.

In another embodiment, the hub behaves autonomously, as described in conjunction with the intelligent load control devices described above. For example, the hub may operate autonomously to determine, based on electrical measurements such as voltage measurements, to isolate or shed certain loads. This is advantageous in situations where the hub is unable to communicate with the ESS, although there may be less visibility to the ESS with respect to what is occurring with loads at any given time in such a decentralized architecture.

As another example, in some embodiments, the ESS sends configuration commands to the hub, such as in the event that smart breakers are being used. For example, smart breakers may have a large number of settings (beyond, for example, opening and closing), such as frequency cutoff, voltage cutoff, droop curves, etc. By receiving configuration commands, the hub may then set those configuration parameters when commanded to do so by the ESS. One example of such a configuration parameter or option is scheduling. For example, the hub may be provided instructions or commands to disconnect a pool heater between 5 pm and 9 pm every day to avoid time of use energy charges. Based on the configuration parameters received from the ESS, the hub may operate independently of the ESS for the purposes of time of user arbitration and load shedding, and in conjunction with the ESS when both solar and ESS are available. As shown in this example, the hub may be configured to both execute instructions received from an ESS, as well as operate autonomously.

Another example installation embodiment is shown at 616. In this example, the hub and relay are packaged into what is referred to herein as a "grey box" implementation, such as a junction box. Such an installation implementation may be used for appliances/loads such as air conditioners. For example, air conditioners often have a disconnect junction box that is next to the outdoor unit of the air conditioner, where the disconnect junction box may be used for servicing. Typically there is exposed conduit at this location, and the "grey box" implementation may be used at this place to intercept the power going to the air conditioning for the purposes of load control.

For example, in the case that the air conditioner were the only device/load to be controlled, and it is inconvenient to package the hub and the relay into the panel, the hub and relay may instead by packaged within a standalone box. At installation time, the conduit is cut, and the standalone box is wired in with a terminal. From an electrical architecture standpoint, this configuration is the same as other configurations shown in FIG. 6. In this example, rather than "piggybacking" or riding on, or being conveyed on the back of a breaker, power is intercepted directly. In some embodiments, in this configuration, the hub may communicate with the ESS through communications such as PLC (as the junction box is wired into power), or wirelessly (e.g., over WiFi).

Another example installation embodiment is shown at 618. In this example, a version of the "grey box" implementation described above is shown, along with relays within a panel. In this example, suppose that the panel is space constrained, and the hub cannot fit within the panel. In this example installation, the hub and a terminal block (e.g., terminal block 606) are housed in a "grey box" that is next to the panel. In this case, although the hub is installed next to the panel, this installation is functionally the same as the example implementations shown at 608, 614, 610, and 612.

One advantage of the load control hub architecture described herein is that the architecture allows for a configurable number of relays. For example, there is a wide variation in the loads in homes. If a home were to have two pool pumps or two separate air conditioners, such variations may be accommodated by simply installing another relay and connecting it to an existing hub. This is in contrast to having a single integrated package, which may require carrying a variety of different stock-keeping units (SKUs) depending on how many loads are to be shed at a particular location.

Further, the hub-relay architecture described herein provides easier updating over time, such as mid-cycle updates. For example, suppose that a homeowner later decides to add an air conditioner or an EV charger. The new load may be accommodated for by simply adding another relay onto a breaker and connecting the relay to the already existing hub. The hub may also be easily upgraded without having to move the existing relays.

In some embodiments, the hub is configured to use electrical measurements (e.g., current voltage sensors in the hub) to determine what loads are attached to each of the relays. In this way, configuration need not be performed at commissioning. Further, commissioning errors may be caught. For example, if a user indicates that a particular relay is attached to an air conditioner, but in fact the relay is attached to a breaker connected to a range, the hub (and/or ESS) may identify those errors and correct them by evaluating, for example, current-voltage profiles obtained based on electrical measurements made by the hub (e.g., using the load characterization techniques described above). For example, machine learning models, regression logic, etc. may be used to classify loads based on their current-voltage profiles and to determine the type of load.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A power control device, comprising:
    a first interface to an electrical load;
    a second interface to an electrical network;
    a sensor configured to sense a characteristic of the electrical network;
    a microprocessor configured to:
        determine a load state of an AC (Alternating Current) power source that delivers power over the electrical network based at least in part on the sensed characteristic of the electrical network, wherein the AC power source comprises an inverter, and wherein the microprocessor is configured to determine the load state of the inverter based at least in part on a model of the inverter; and
        determine whether the electrical network is in a state in which load shedding should be performed based at least in part on the sensed characteristic of the electrical network; and
    a switch configured to control power from the electrical network to the electrical load.

2. The power control device recited in claim 1, wherein determining the load state comprises determining an instantaneous load on the AC power source.

3. The power control device recited in claim 2, wherein the microprocessor is configured to determine a steady-state component of the load state and a transient component of the load state.

4. The power control device recited in claim 1, wherein the sensed characteristic of the electrical network comprises a measurement of one or more line voltages, and wherein the load state of the AC power source is determined based at least in part on the measurement of the one or more line voltages.

5. The power control device recited in claim 4, wherein the load state is determined based at least in part on a series of line voltage measurements over a period of time.

6. The power control device recited in claim 1, wherein controlling the power from the electrical network to the electrical load comprises interrupting the power from the electrical network to the electrical load.

7. The power control device recited in claim 1, wherein the microprocessor is configured to autonomously actuate the switch according to a preconfigured load control program.

\* \* \* \* \*